US010780915B2

United States Patent
Rakouth et al.

(10) Patent No.: US 10,780,915 B2
(45) Date of Patent: Sep. 22, 2020

(54) VEHICLE STEERING SYSTEM HAVING A USER EXPERIENCE BASED AUTOMATED DRIVING TO MANUAL DRIVING TRANSITION SYSTEM AND METHOD

(71) Applicant: Steering Solutions IP Holding Corporation, Saginaw, MI (US)

(72) Inventors: Heritianarisoa Rakouth, Rochester Hills, MI (US); Joachim J. Klesing, Rochester, MI (US); Pierre C. Longuemare, Paris (FR); Qi Peng, Redford Charter Township, MI (US); Steve J. Collier-Hallman, Frankenmuth, MI (US); Farhad Bolourchi, Novi, MI (US); John F. Schulz, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 15/829,224

(22) Filed: Dec. 1, 2017

(65) Prior Publication Data

US 2018/0154932 A1 Jun. 7, 2018

Related U.S. Application Data

(60) Provisional application No. 62/431,391, filed on Dec. 7, 2016.

(51) Int. Cl.
*B62D 6/08* (2006.01)
*B62D 5/09* (2006.01)
(Continued)

(52) U.S. Cl.
CPC .............. *B62D 6/08* (2013.01); *B62D 1/183* (2013.01); *B62D 1/283* (2013.01); *B62D 5/091* (2013.01); *B62D 6/008* (2013.01); *B62D 5/06* (2013.01)

(58) Field of Classification Search
None
See application file for complete search history.

(56) References Cited

U.S. PATENT DOCUMENTS

| 4,315,117 A | 2/1982 | Kokubo et al. |
| 4,337,967 A | 7/1982 | Yoshida et al. |

(Continued)

FOREIGN PATENT DOCUMENTS

| CN | 1722030 A | 1/2006 |
| CN | 1736786 A | 2/2006 |

(Continued)

OTHER PUBLICATIONS

EP Application No. 14156903.8 Extended European Search Report, dated Jan. 27, 2015, 10 pages.

(Continued)

*Primary Examiner* — Thomas G Black
*Assistant Examiner* — Demetra R Smith-Stewart
(74) *Attorney, Agent, or Firm* — Dickinson Wright PLLC

(57) ABSTRACT

A steer by wire steering system includes a steering wheel selectively coupled to a steering shaft, the steering wheel and steering shaft axially movable between a deployed position and a retracted position; an advanced driver assist system configured to steer the steerable wheels of a vehicle that is in communication with the steering wheel and steering shaft, the ADAS configured to selectively control the steering of the steerable wheels in an autonomous driving mode and a manual driving mode; and a steering system controller in communication with the ADAS, the steering (Continued)

system controller programmed to, while the steering wheel is in the retracted position, move the steering wheel to the deployed position and operatively couple the steering wheel to the steering shaft, in response to a vehicle operator request to deactivate a portion of the ADAS and transition from the autonomous driving mode to the manual driving mode.

13 Claims, 26 Drawing Sheets

(51) Int. Cl.
*B62D 6/00* (2006.01)
*B62D 1/183* (2006.01)
*B62D 1/28* (2006.01)
*B62D 5/06* (2006.01)

(56) References Cited

U.S. PATENT DOCUMENTS

| | | | |
|---|---|---|---|
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,240,284 A | 8/1993 | Takada et al. |
| 5,295,712 A | 3/1994 | Omura |
| 5,319,803 A | 6/1994 | Allen |
| 5,469,356 A | 11/1995 | Hawkins et al. |
| 5,488,555 A | 1/1996 | Asgari |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,070,686 A | 6/2000 | Pollmann |
| 6,138,788 A | 10/2000 | Bohner et al. |
| 6,170,862 B1 | 1/2001 | Hoagland et al. |
| 6,212,453 B1 | 4/2001 | Kawagoe et al. |
| 6,227,571 B1 | 5/2001 | Sheng et al. |
| 6,256,561 B1 | 7/2001 | Asanuma |
| 6,301,534 B1 | 10/2001 | McDermott, Jr. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,481,526 B1 | 11/2002 | Millsap et al. |
| 6,575,263 B2 | 6/2003 | Hjelsand et al. |
| 6,578,449 B1 | 6/2003 | Anspaugh et al. |
| 6,598,695 B1 | 7/2003 | Menjak et al. |
| 6,612,392 B2 | 9/2003 | Park et al. |
| 6,612,393 B2 | 9/2003 | Bohner et al. |
| 6,778,890 B2 | 8/2004 | Shimakage et al. |
| 6,799,654 B2 | 10/2004 | Menjak et al. |
| 6,817,437 B2 | 11/2004 | Magnus et al. |
| 6,819,990 B2 | 11/2004 | Ichinose |
| 6,820,713 B2 | 11/2004 | Menjak et al. |
| 6,889,792 B1 | 5/2005 | Fardoun et al. |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,150,581 B2 | 4/2012 | Iwazaki et al. |
| 8,170,725 B2 | 5/2012 | Chin et al. |
| 8,170,751 B2 | 5/2012 | Lee et al. |
| 8,260,482 B1 | 9/2012 | Szybalski et al. |
| 8,352,110 B1 | 1/2013 | Szybalski et al. |
| 8,374,743 B2 | 2/2013 | Salinger |
| 8,452,492 B2 | 5/2013 | Buerkle et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,632,096 B1 | 1/2014 | Quinn et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,725,230 B2 * | 5/2014 | Lisseman ................ A61B 5/01 |
| | | 180/272 |
| 8,798,852 B1 | 8/2014 | Chen et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 * | 12/2014 | Lombrozo ........... B62D 15/025 |
| | | 701/41 |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,159,221 B1 | 10/2015 | Stantchev |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Yamaguchi |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,315,210 B2 | 4/2016 | Sears et al. |
| 9,333,983 B2 * | 5/2016 | Lathrop .................. B62D 1/04 |
| 9,352,752 B2 | 5/2016 | Cullinane et al. |
| 9,360,865 B2 | 6/2016 | Yopp |
| 9,714,036 B2 | 7/2017 | Yamaoka et al. |
| 9,725,098 B2 | 8/2017 | Abou-Nasr et al. |
| 9,810,727 B2 * | 11/2017 | Kandler ............. G01R 27/2605 |
| 9,845,109 B2 | 12/2017 | George et al. |

(56) References Cited

U.S. PATENT DOCUMENTS

| | | |
|---|---|---|
| 9,868,449 B1 | 1/2018 | Holz et al. |
| 10,040,330 B2 | 8/2018 | Anderson |
| 10,137,929 B2 | 11/2018 | Aoki et al. |
| 2002/0016661 A1 | 2/2002 | Frediani et al. |
| 2003/0046012 A1 | 3/2003 | Yamaguchi |
| 2003/0094330 A1 | 5/2003 | Boloorchi et al. |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0133330 A1 | 7/2004 | Ono et al. |
| 2004/0182640 A1 | 9/2004 | Katou et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0155809 A1 | 7/2005 | Krzesicki et al. |
| 2005/0197746 A1 | 9/2005 | Pelchen et al. |
| 2005/0275205 A1 | 12/2005 | Ahnafield |
| 2006/0224287 A1 | 10/2006 | Izawa et al. |
| 2006/0244251 A1 | 11/2006 | Muller |
| 2006/0271348 A1 | 11/2006 | Rossow et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito et al. |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2009/0024278 A1 | 1/2009 | Kondo et al. |
| 2009/0189373 A1 | 7/2009 | Schramm et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0250081 A1 | 9/2010 | Kinser et al. |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0224876 A1 | 9/2011 | Paholics et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0150388 A1 | 6/2012 | Boissonnier et al. |
| 2012/0197496 A1 | 8/2012 | Limpibunterng et al. |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1* | 1/2013 | Gazit .................. B62D 1/28 340/438 |
| 2013/0325202 A1 | 1/2013 | Howard et al. |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0253765 A1 | 9/2013 | Bolourchi et al. |
| 2013/0292955 A1 | 11/2013 | Higgins et al. |
| 2014/0012469 A1 | 1/2014 | Kunihiro et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0300479 A1 | 4/2014 | Wolter et al. |
| 2014/0152551 A1 | 6/2014 | Mueller et al. |
| 2014/0156107 A1 | 6/2014 | Karasawa et al. |
| 2014/0168061 A1 | 6/2014 | Kim |
| 2014/0172231 A1 | 6/2014 | Terada et al. |
| 2014/0277896 A1 | 9/2014 | Lathrop et al. |
| 2014/0277945 A1 | 9/2014 | Chandy |
| 2014/0303827 A1 | 10/2014 | Dolgov et al. |
| 2014/0306799 A1 | 10/2014 | Ricci |
| 2014/0309816 A1 | 10/2014 | Stefan et al. |
| 2014/0354568 A1 | 12/2014 | Andrews et al. |
| 2015/0002404 A1 | 1/2015 | Hooton |
| 2015/0006033 A1 | 1/2015 | Sekiya |
| 2015/0014086 A1 | 1/2015 | Eisenbarth |
| 2015/0032322 A1 | 1/2015 | Wimmer et al. |
| 2015/0032334 A1 | 1/2015 | Jang |
| 2015/0051780 A1 | 1/2015 | Hahne |
| 2015/0120142 A1 | 1/2015 | Park et al. |
| 2015/0210273 A1 | 2/2015 | Kaufmann et al. |
| 2015/0060185 A1 | 3/2015 | Feguri |
| 2015/0120124 A1* | 4/2015 | Bartels .................. B60W 50/10 701/23 |
| 2015/0120141 A1 | 4/2015 | Lavoie et al. |
| 2015/0246673 A1 | 4/2015 | Tseng et al. |
| 2015/0123947 A1 | 5/2015 | Jubner et al. |
| 2015/0251666 A1 | 7/2015 | Attard et al. |
| 2015/0283998 A1 | 9/2015 | Lind et al. |
| 2015/0324111 A1 | 9/2015 | Jubner et al. |
| 2015/0314804 A1 | 11/2015 | Aoki et al. |
| 2015/0338849 A1 | 11/2015 | Nemec et al. |
| 2016/0001781 A1 | 1/2016 | Fung et al. |
| 2016/0009332 A1 | 1/2016 | Sirbu |
| 2016/0071418 A1 | 3/2016 | Oshida et al. |
| 2016/0075371 A1 | 3/2016 | Varunjikar et al. |
| 2016/0082867 A1 | 3/2016 | Sugioka et al. |
| 2016/0200246 A1 | 3/2016 | Lisseman et al. |
| 2016/0121918 A1* | 5/2016 | Soderlind .............. B62D 1/181 74/493 |
| 2016/0159251 A1* | 6/2016 | Ebina .................. B60N 2/0244 701/49 |
| 2016/0185387 A1 | 6/2016 | Kuoch |
| 2016/0200343 A1 | 6/2016 | Lisseman et al. |
| 2016/0200344 A1* | 7/2016 | Sugioka .................. B62D 1/183 74/493 |
| 2016/0207536 A1 | 7/2016 | Yamaoka et al. |
| 2016/0207538 A1 | 7/2016 | Urano et al. |
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0244070 A1* | 8/2016 | Bendewald .......... B60W 50/08 |
| 2016/0280251 A1 | 9/2016 | George et al. |
| 2016/0288825 A1 | 10/2016 | Varunjikar et al. |
| 2016/0291862 A1 | 10/2016 | Yaron et al. |
| 2016/0318540 A1 | 11/2016 | King |
| 2016/0318542 A1 | 11/2016 | Pattok et al. |
| 2016/0347347 A1 | 12/2016 | Lubischer et al. |
| 2016/0347348 A1 | 12/2016 | Lubischer et al. |
| 2016/0355207 A1 | 12/2016 | Urushibata |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0364003 A1 | 12/2016 | O'Brien |
| 2016/0368522 A1* | 12/2016 | Lubischer .............. B62D 1/181 |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer et al. |
| 2017/0029009 A1 | 2/2017 | Rouleau |
| 2017/0029018 A1 | 2/2017 | Lubischer et al. |
| 2017/0066473 A1 | 3/2017 | Yu et al. |
| 2017/0101032 A1* | 4/2017 | Sugioka .................. B60N 2/763 |
| 2017/0101127 A1 | 4/2017 | Varunjikar et al. |
| 2017/0113712 A1 | 4/2017 | Watz |
| 2017/0151950 A1 | 6/2017 | Lien |
| 2017/0151978 A1 | 6/2017 | Oya et al. |
| 2017/0158055 A1 | 6/2017 | Kim et al. |
| 2017/0158222 A1 | 6/2017 | Schulz et al. |
| 2017/0166222 A1 | 6/2017 | James |
| 2017/0203785 A1 | 7/2017 | Naik et al. |

(56) References Cited

U.S. PATENT DOCUMENTS

| | | |
|---|---|---|
| 2017/0225704 A1 | 8/2017 | Urushibata |
| 2017/0232998 A1 | 8/2017 | Ramanujam et al. |
| 2017/0240204 A1 | 8/2017 | Raad et al. |
| 2017/0242428 A1 | 8/2017 | Pal et al. |
| 2017/0293306 A1 | 10/2017 | Riefe et al. |
| 2017/0297606 A1* | 10/2017 | Kim .................. B62D 1/181 |
| 2017/0305425 A1* | 10/2017 | Xing .................. B60W 30/182 |
| 2017/0305458 A1 | 10/2017 | Wang et al. |
| 2017/0334458 A1 | 11/2017 | Sato et al. |
| 2018/0015948 A1 | 1/2018 | Varunjikar et al. |
| 2018/0017968 A1 | 1/2018 | Zhu et al. |
| 2018/0029632 A1 | 2/2018 | Bodtker et al. |
| 2018/0059661 A1 | 3/2018 | Sato et al. |
| 2018/0059662 A1 | 3/2018 | Sato et al. |
| 2018/0072341 A1 | 3/2018 | Schulz et al. |
| 2018/0093700 A1 | 4/2018 | Chandy |
| 2018/0105198 A1 | 4/2018 | Bodtker et al. |
| 2018/0107214 A1 | 4/2018 | Chandy |
| 2018/0136727 A1 | 5/2018 | Chandy |
| 2018/0148087 A1 | 5/2018 | Wang et al. |
| 2018/0297555 A1 | 10/2018 | Simon et al. |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102320324 A | 1/2012 |
| CN | 102452391 A | 5/2012 |
| CN | 202563346 U | 11/2012 |
| CN | 102939474 A | 2/2013 |
| CN | 103419840 A2 | 12/2013 |
| CN | 103448785 A | 12/2013 |
| CN | 103677253 A | 3/2014 |
| CN | 103777632 A | 5/2014 |
| CN | 103818386 A | 5/2014 |
| CN | 104024084 A | 9/2014 |
| CN | 104968554 A | 10/2015 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102008057313 A1 | 10/2009 |
| DE | 102010025197 A1 | 12/2011 |
| DE | 102012010887 A1 | 12/2013 |
| DE | 102014204855 A1 | 9/2014 |
| DE | 102013110865 A1 | 4/2015 |
| DE | 102014223128 A1 | 5/2016 |
| EP | 1559630 A2 | 8/2005 |
| EP | 1783719 A2 | 5/2007 |
| EP | 1932745 A2 | 6/2008 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S60157963 A | 8/1985 |
| JP | S60164629 A | 8/1985 |
| JP | H105162652 A | 6/1993 |
| JP | 2768034 B2 | 6/1998 |
| JP | 2007253809 A | 10/2007 |
| JP | 2011043884 A | 3/2011 |
| JP | 20174099 A | 1/2017 |
| KR | 20100063433 A | 6/2010 |
| WO | 0147762 A1 | 7/2001 |
| WO | 2006099483 A1 | 9/2006 |
| WO | 2007034567 A1 | 3/2007 |
| WO | 2010082394 A1 | 7/2010 |
| WO | 2010116518 A1 | 10/2010 |
| WO | 2013080774 A1 | 6/2013 |
| WO | 2013101058 A1 | 7/2013 |

OTHER PUBLICATIONS

EP Application No. 14156903.8 Partial European Search Report dated Sep. 23, 2014, 6 pages.

EP Application No. 15152834.6 Extended European Search Report dated Oct. 8, 2015, 7 pages.

European Application No. 12196665.9 Extended European Search Report dated Mar. 6, 2013, 7 pages.

European Search Report for European Application No. 13159950.8; dated Jun. 6, 2013; 7 pages.

European Search Report for related European Application No. 15152834.6, dated Oct. 8, 2015; 7 pages.

Gillespie, Thomas D.; "Fundamentals of Vehicle Dynamics"; Society of Automotive Enginers, Inc.; published 1992; 294 pages.

Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.

Partial European Search Report for related European Patent Application No. 14156903.8, dated Sep. 23, 2014, 6 pages.

Van der Jagt, Pim; "Prediction of Steering Efforts During Stationary or Slow Rolling Parking Maneuvers"; Ford Forschungszentrum Aachen GmbH.; Oct. 27, 1999; 20 pages.

Varunjikar, Tejas; Design of Horizontal Curves With DownGrades Using Low-Order Vehicle Dynamics Models; A Theisis by T. Varunkikar; 2011; 141 pages.

CN Patent Application No. 201610575225.9 First Office Action dated Jan. 22, 2018, 10 pages.

English Translation of Chinese Office Action and Search Report for Chinese Application No. 2016103666609.X dated Dec. 20, 2017, 8 pages.

English Translation of Chinese Office Action and Search Report for Chinese Application No. 201610832736.4 dated Mar. 22, 2018, 6 pages.

English Translation of German Office Action for German Application No. 102017128739.6; dated Feb. 5, 2019; 9 pages.

Yan, et al., "EPS Control Technology Based on Road Surface Conditions," Jun. 22-25, 2009, pp. 933-938, 2009 IEEE International Conference on Information and Automation.

\* cited by examiner

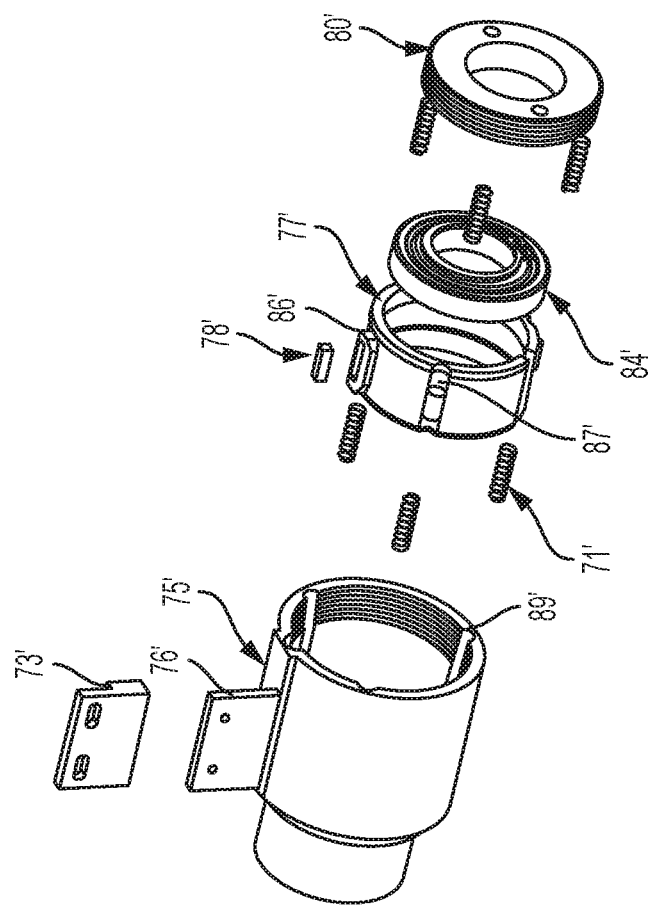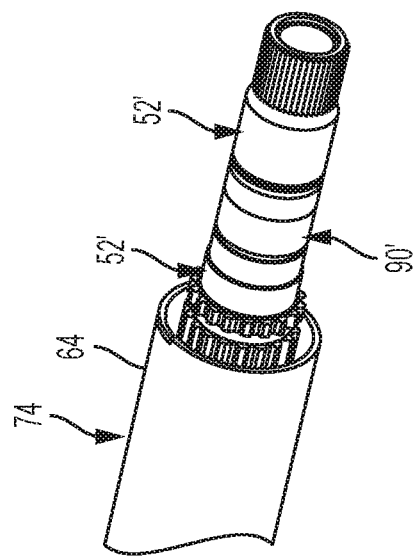
FIG. 16

VEHICLE STEERING SYSTEM HAVING A USER EXPERIENCE BASED AUTOMATED DRIVING TO MANUAL DRIVING TRANSITION SYSTEM AND METHOD

CROSS-REFERENCE TO RELATED APPLICATION

This patent application claims the benefit of priority to U.S. Provisional Patent Application Ser. No. 62/431,391, filed Dec. 7, 2016, which is incorporated herein by reference in its entirety.

BACKGROUND OF THE INVENTION

The present invention relates to a steering system for a vehicle, and more particularly to a steering system having a stowable hand wheel and configured for autonomous driving and manual driving, and more particularly to a steering system having a user experience based automated driving to manual driving transition system and method.

Presently, vehicles are being developed having both manual driving (MD) mode and autonomous driving (AD) mode driving capabilities. During some autonomous driving events while in AD mode the steering wheel of the selectively autonomous vehicle is not necessary to control the selectively autonomous vehicle and is stored in a stowed position. Under certain conditions, it is desirable to transition from AD mode back to MD mode, including conditions where the vehicle is in motion.

Current methods for AD mode to MD mode transition rely upon the fusion of data from several driver monitoring devices such as cameras that track the driver's eye gaze and also provide hands-on-the-wheel detection. To enable Automotive Safety Integrity Level (ASIL) D with 100% expected level of accuracy, it has generally necessary to supplement the information available from the monitoring devices described above with additional information. While such devices are useful, camera-based driver monitoring system pose potential driver privacy issues. Also, while the AD mode to MD mode transition using these systems is deemed safe, the driver is not necessarily in control of the transition as there is no explicit feedback between the driver and the driving automation steering system.

As such, it is very desirable to provide a steering system and vehicle incorporating such a steering system that is configured to transition safely from AD mode to MD mode, including under conditions where the vehicle is moving, and to provide feedback between the driver and the automation system using the steering system during the transition.

SUMMARY OF THE INVENTION

According to an embodiment of the present invention, a steer by wire steering system for a vehicle is disclosed. The system includes a steering wheel selectively coupled to a steering shaft, the steering wheel and steering shaft axially movable between a deployed position and a retracted position; an advanced driver assist system configured to steer the steerable wheels of a vehicle that is in communication with the steering wheel and steering shaft, the advanced driver assist system configured to selectively control the steering of the steerable wheels in an autonomous driving mode that does not require steering input of a vehicle operator and a manual driving mode that does require steering input of a vehicle operator; and a steering system controller in communication with the advanced driver assist system, the steering system controller programmed to, while the steering wheel is in the retracted position, move the steering wheel to the deployed position and operatively couple the steering wheel to the steering shaft, in response to a vehicle operator request to deactivate a portion of the advanced driver assist system and transition from the autonomous driving mode to the manual driving mode.

According to another embodiment of the present invention, a selectively autonomously controllable vehicle comprising a steer by wire steering system is disclosed. The vehicle includes a steering shaft axially movable between a deployed position and a retracted position; an advanced driver assist system configured to steer the steerable wheels of a vehicle that is in communication with the steering shaft and steering shaft, the advanced driver assist system configured to selectively control the steering of the steerable wheels in an autonomous driving mode that does not require steering input of a vehicle operator and a manual driving mode that does require steering input of a vehicle operator; and a steering system controller in communication with the advanced driver assist system, the steering system controller programmed to, while the steering shaft is in the retracted position, move the steering shaft to the deployed position in response to a vehicle operator request to deactivate a portion of the advanced driver assist system and transition from the autonomous driving mode to the manual driving mode.

According to yet another embodiment of the present invention, a force sensor assembly for a steering system is disclosed. The assembly includes an axially extending steering shaft; and a force sensor that is operatively coupled to the steering shaft and configured to sense a generally axial force applied to the steering shaft or a steering wheel.

According to yet another embodiment of the present invention, a Steering Wheel Stow Assist System (SWSAS) for a steering system of a vehicle is disclosed. The system includes a steering wheel selectively coupled to a steering shaft, the steering wheel and steering shaft axially movable between a deployed position and a retracted position; an advanced driver assist system configured to steer the steerable wheels of a vehicle that is in communication with the steering wheel and steering shaft, the advanced driver assist system configured to selectively control the steering of the steerable wheels in an autonomous driving mode that does not require steering input of a vehicle operator and a manual driving mode that does require steering input of a vehicle operator; an axial force sensor operatively coupled to the steering shaft; and a steering system controller in communication with the advanced driver assist system and the axial force sensor, the steering system controller programmed to, while the steering wheel is in the retracted position, move the steering wheel to the deployed position and operatively couple the steering wheel to the steering shaft, in response to a vehicle operator request to deactivate a portion of the advanced driver assist system and transition from the autonomous driving mode to the manual driving mode.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 16 is perspective view of unassembled components of the magnetic flux/displacement force sensor of FIG. 14;

DETAILED DESCRIPTION

Figure 1:
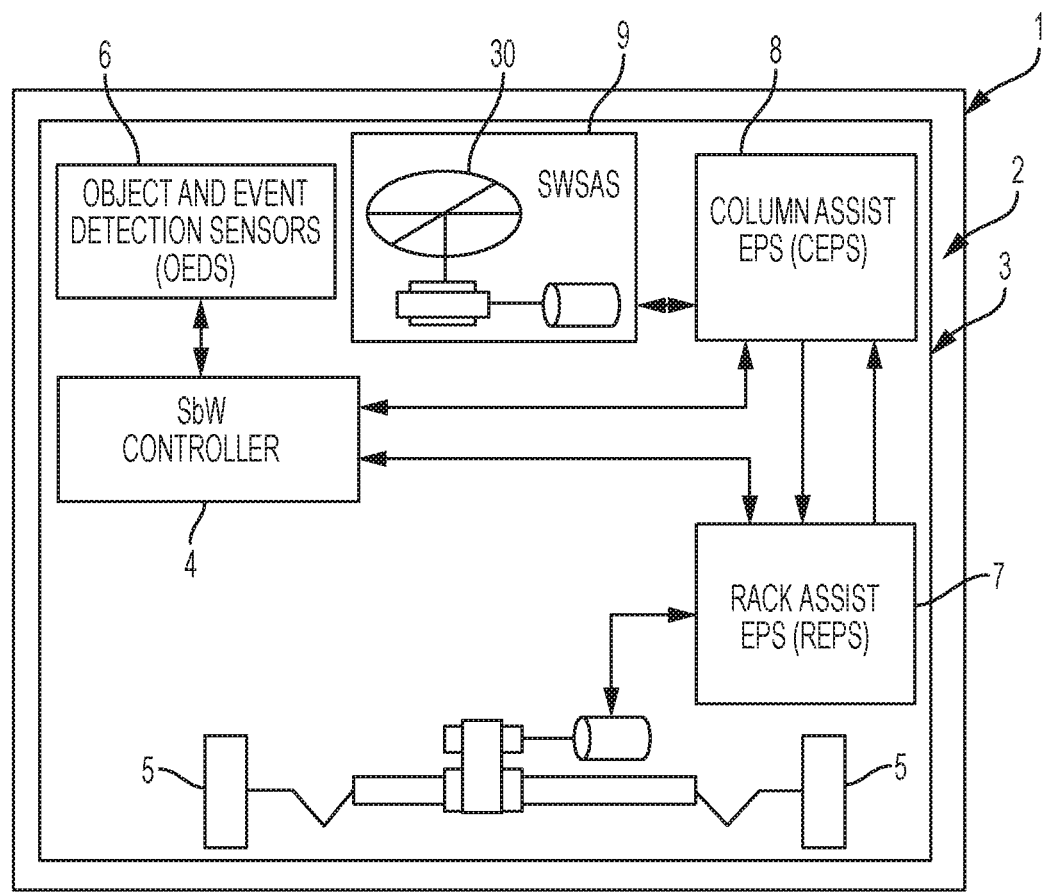
FIG. 1 is a schematic illustration of an embodiment of steering system.

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring FIGS. 1-4, an embodiment of a Steering On Demand (SOD) steering system 2 for a vehicle 1, such as a motor vehicle, is disclosed. The vehicle 1 may be any suitable vehicle, including an automobile, sport utility vehicle, crossover vehicle, light duty truck or heavy duty truck. The vehicle 1 is an autonomous or semi-autonomous driving vehicle configured for selective operation in an autonomous driving (AD) mode 12, where a driver steering input is not required, or a manual driving (MD) mode 14, where a driver steering input is required. The SOD system 2 comprises a Steer-By-Wire (SbW) steering system, which is characterized in that there is no mechanical linkage between the column electric power steering (CEPS) system and the rack electric power steering (REPS) system. The SbW steering system 3 comprises a system architecture comprising a SbW controller 4 that is configured to communicate with the other elements of the system to receive signal input and provide signal output to affect control of the steering of the steerable road wheels 5 of the vehicle 1. The SbW controller 4 is in signal communication with the Object and Event Detection Sensors (OEDS) 6 of the vehicle 1 including one or more radar, camera, lidar, and global positioning system GPS) to control path planning of the vehicle 1 movement under AD mode operation. The SbW controller 4 is also in signal communication with, and controlling, the Rack Electric Power Steering (REPS) system 7 that controls the road-wheels torque and position. The SbW controller 4 is also in signal communication with, and controlling, the Column Electric Power Steering (CEPS) system 8 that is used to replicate the road-wheels position when the steering wheel is in moving mode under AD mode operations and that is used to steer the vehicle (through the REPS system 7) under MD mode operations. The SbW controller 4 is also in signal communication with and controlling the Steering Wheel Stow Assist System (SW-SAS) 9 that is used as the enabler or provider for the AD mode 10 to MD mode 12 transition. The SWSAS 9 is in signal communication with the CEPS 8 for enabling features including the Driver's Intent Analysis (DIA) and Driver's Readiness Analysis (DRA) described herein.

Figure 2:
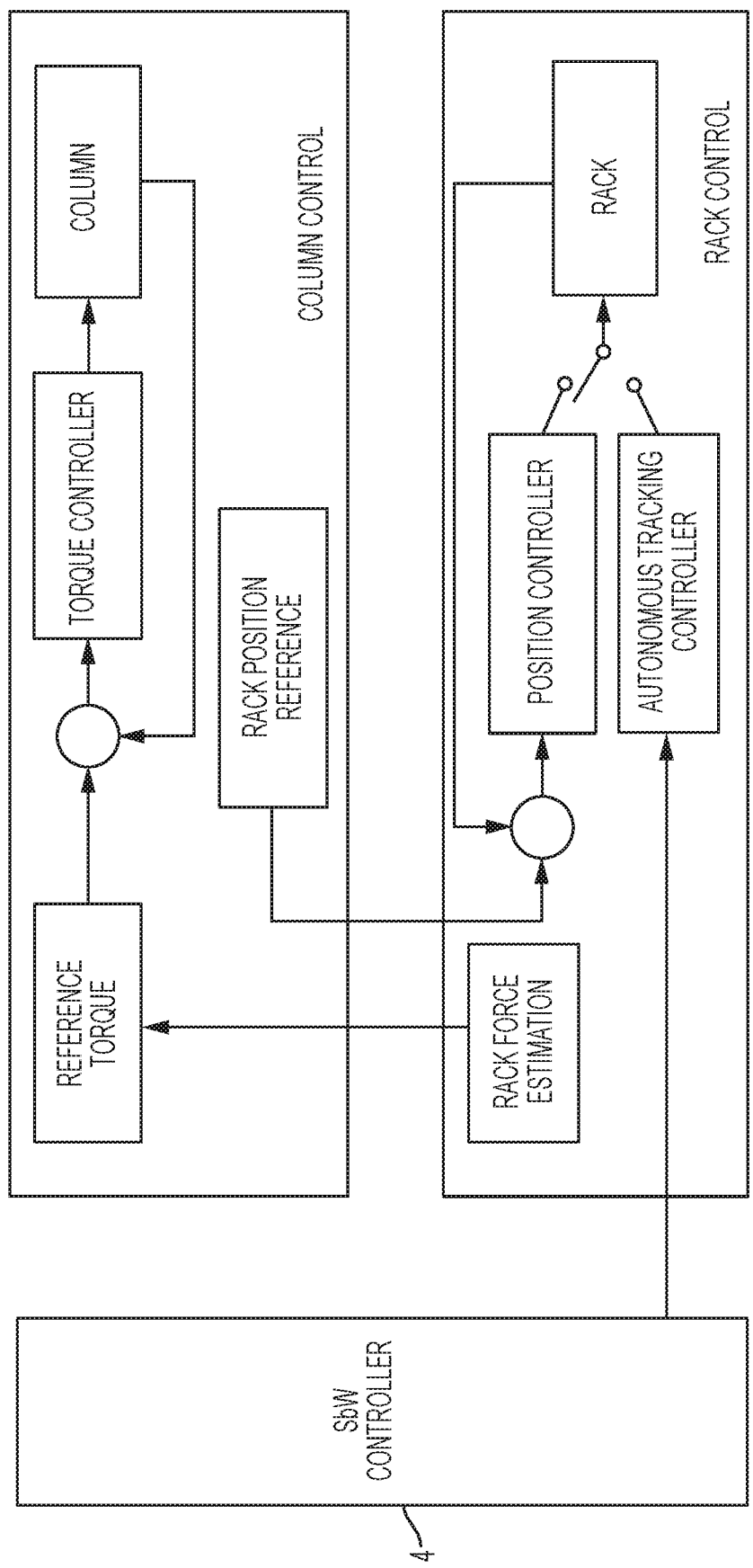
FIG. 2 is a block diagram of an embodiment of a control architecture of the steering system.

Referring to FIG. 2, a control architecture of the SOD steering system 2 is illustrated. The SOD steering system 2 control architecture includes the SbW controller 4.

Figure 3:
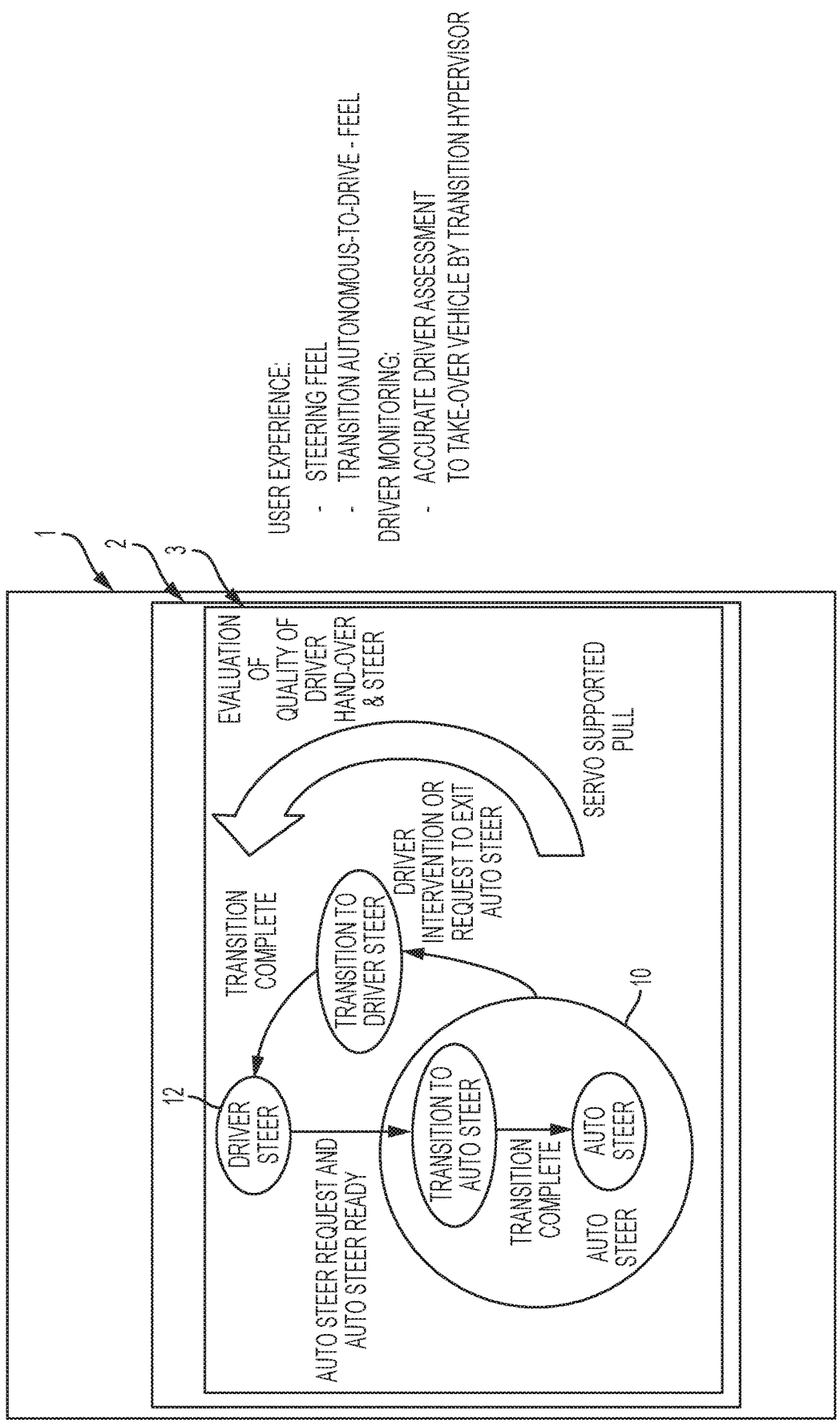
FIG. 3 is a schematic illustration of an embodiment of a steering system that includes a User Experience Based Automated Driving to Manual Driving Transition (UX-AD2MD) system.

Referring to FIG. 3, in one embodiment, included is an SOD SbW steering system 2 that includes a User Experience Based Automated Driving to Manual Driving Transition (UX-AD2MD) system 14. The UX-AD2MD system 14 is configured for use in the SOD SbW steering system 2 of a vehicle 1 that is configured for autonomous driving, particularly in accordance with SAE J3016 Automation Levels 3 and 4 driving applications. In particular, the present invention comprises a vehicle 1 and SOD SbW vehicle steering system 2, comprising a UX-AD2MD system architecture 14, that is configured to provide and enable safe transition from an Automated Driving (AD) mode 10 to a Manual Driving (MD) mode 12 triggered by a recognized driver's intervention or action detected and tracked through the vehicle hand wheel (hereafter referred to as a Smart Hand Wheel (SHW) or steering wheel 30) and a retractable/deployable power assist column steering system (hereinafter the Steering Wheel Stow Assist System (SWSAS)) 9. The SWSAS 9 operates in the context of Steering on Demand (SOD), whereby the steering wheel 30 can be stowed during an autonomous driving (AD) mode 10 in a retracted or stowed position and subsequently selectively redeployed during operation of the vehicle to provide a manual driving (MD) mode 12, whereby an operator assumes control of the vehicle 1, particularly control of the SOD SbW steering system 3. The UX-AD2MD system 14 provides improved redundancy and safety margins over previous steering systems, including those that include the camera-based AD/MD system and transition method described above, thereby allowing the operator/driver to control the AD/MD transition and providing explicit feedback between the driver and the automation system, thereby providing an enhanced user experience during the transition.

The UX-AD2MD system 14 keeps track of the driver's interaction with the vehicle steering system (VSS) by means of data collected from the steering column (SC) and the steering wheel or hand-wheel (HW) 30. Also, the UX-AD2MD system 14 includes feedback implemented in the form of a haptic handshake with the vehicle driver (e.g., by HW vibration and/or audible or visible indicators) and steering angle comparison between the driver's input and the SOD SbW steering system 2 input. Moreover, the SWSAS 9 unit leverages the full user experience from the beginning of the hand wheel stowing operation to the full take in providing assistance (and thus, providing constant feedback to establish and ensure the driver's trust and confidence) to the driver during the entire AD mode 10 to MD mode 12 transition. The UX-AD2MD system 14 is composed of a plurality of sensors and algorithms that provide a safe transition between automated driving (AD) mode 10 and manual driving (MD) mode 12.

Figure 4:
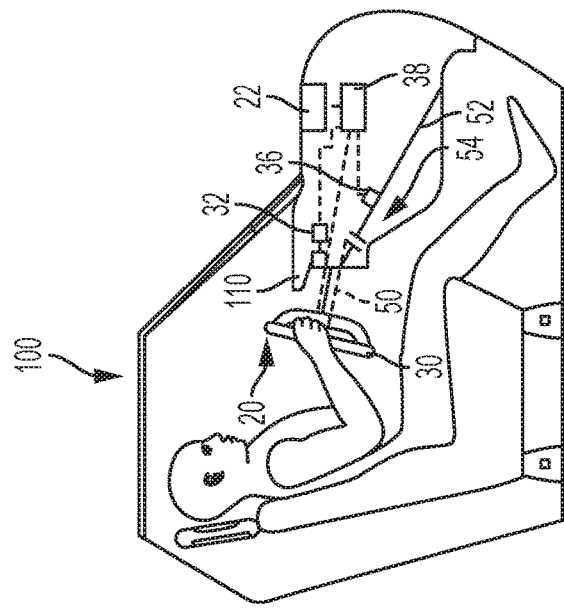
FIG. 4 is a schematic side view of an embodiment of a vehicle compartment having a steering system in a retracted position.

As illustrated in FIG. 4, in one embodiment, the UX-AD2MD system 14 is composed of a plurality of sensors, devices, and/or algorithms. In another embodiment, the UX-AD2MD system 14 system includes the following devices and/or sensors and/or algorithms. The UX-AD2MD system 14 includes a Stow Position Sensor (SPS) 15 that senses whether the SOD SbW steering system 2 and HW 30 is in a stowed position or not, including whether the system and handwheel are deployed. The UX-AD2MD system 14 also includes a Stow Force Sensing Device (SFSD) 16 that is configured to sense a force, particularly an axial compressive (inward toward the stowed or retracted position or tensile (outward toward the deployed position) force applied along the column and column shaft axis. The UX-AD2MD system 14 also includes a Tilt Angle Sensor (TAS) 17 that is configured to sense the angle of the column and column shaft axis with a substantially horizontal vehicle reference plane, such as the vehicle floor. The UX-AD2MD system 14 also includes a Tilt Force Sensing Device (TFSD) 18 that is configured to sense an angular compressive (downwardly toward the vehicle floor tending to decrease the tilt angle) or tensile (upwardly toward the vehicle roof tending to increase the tilt angle) force or torque about the tilt axis. The UX-AD2MD system 14 also includes a Stow Actuator (SA) 19 that is configured to actuate and affect the substantially axial stowing/retracting and deploying movement of the handwheel 30, column shaft and other deployable/retractable portions of the SOD SbW steering system 3. The UX-AD2MD system 14 also includes a Tilt Actuator (TA) 21 that is configured to actuate and affect the substantially angular stowing/retracting and deploying movement of the handwheel 30, column shaft and other deployable/retractable portions of the SOD SbW steering system 3. The UX-AD2MD system 14 also includes a Steer by Wire (SbW) Hypervisor 25 comprising the SWSAS 9. The UX-AD2MD system 14 also includes a Hands On/Off Detect System (HOODS) 23. The UX-AD2MD system 14 is incorporated in a vehicle 1 along with other Advanced Driver Assistance System (ADAS) sensors and systems (e.g., radar, lidar, etc.), the global positioning system(s) (GPS), the Rack Electrical Power Steering (REPS) system, and the Column Electrical Power Steering (CEPS) system.

The SWSAS system 9 comprises SPS 15, SFSD 16, TAS 17, TFSD 18, SA 19, and TA 21 to provide input on the status of the steering column position and the operator's intention regarding the deployment and/or retraction of the SOD SbW steering system 2 and HW 30 along with the HOODS system 23.

The SWSAS 9, by employing the sensors, actuators, and/or algorithms, allows the UX-AD2MD system 14 to determine if the user and system are ready to transfer the responsibility of driving from the automated system in the AD mode 10 to the driver for operation of the vehicle 1 in the MD mode 12, or vice versa. The HOODS system 23 provides the vehicle operator or driver the ability to interact with UX-AD2MD system 14 by touching the HW 30 to initiate a request for manual takeover of the driving functions of the vehicle 1 in MD mode 12, and likewise may also be used to initiate a driver request to activate the automated driving system for operation of vehicle 1 in the AD mode 10.

The SbW Hypervisor 25 provides a further level of protection for the driver by fusing a plurality of sensor inputs and authorizations to allow the transfer of the driving responsibilities.

Referring to FIGS. 4-7, a side view of a vehicle compartment 100 of a vehicle 1, which may include an autonomous vehicle, an autonomously driven vehicle, or a selectively autonomous vehicle, is shown. The selectively autonomous vehicle is provided with a steering assembly 20 of the SOD SbW steering system 2 and an advanced driver assist system (ADAS) 22 such that the autonomous vehicle, the autonomously driven vehicle, or the selectively autonomous vehicle is able to perform operations without continuous input from a driver (e.g., steering, accelerating, braking, maneuvering, etc.). The ADAS 22 allows the selectively autonomous vehicle to be at least partially autonomously controlled using sensing, steering, and/or braking technology. A driver of the selectively autonomous vehicle is able to selectively activate or deactivate the ADAS 22 via a switch or other mechanism. A driver of the selectively autonomous vehicle is able to operate the selectively autonomous vehicle 1 without providing a driver input to a component of the steering assembly 20 while the ADAS 22 is activated.

The steering assembly 20 includes an HW or steering wheel 30, an adjustment assembly 32, a torque-displacement sensor 36, and a controller 38. The steering wheel 30 is operatively connected to a steering column that extends along a steering column axis 50. The steering wheel 30 is selectively coupled to a steering shaft 52 that extends through the steering column along the steering column axis 50. The steering wheel 30 may be directly or indirectly coupled to the steering shaft 52 through a coupling mechanism 54. The coupling mechanism 54 may include a disconnect clutch. The steering wheel 30 is coupled to the steering shaft 52 when the disconnect clutch of the coupling mechanism 54 is at least partially engaged and the ADAS 22 is deactivated. The steering wheel 30 is decoupled from the steering shaft 52 when the disconnect clutch of the coupling mechanism 54 is disengaged and the ADAS 22 is activated.

In at least one embodiment, the coupling mechanism 54 is configured as a component of a steer by wire system that electrically couples the steering wheel 30 to the steering shaft 52. The coupling mechanism 54 may include a device, such as a rotary encoder, that interprets rotation of the steering wheel 30 and applies information to an actuator that rotates the steering shaft 52 that pivots a pair of vehicle wheels. The device provides a signal to the actuator when the ADAS 22 is deactivated. The device does not provide a signal or is ignored by the actuator when the ADAS 22 is activated.

The steering wheel 30 is switchable between a rotating state/rotatable state and a non-rotating state. The steering wheel 30 is able to be rotated when the ADAS 22 is deactivated. The driver of the selectively autonomous vehicle is able to provide directional control of the selectively autonomous vehicle through the steering wheel 30 when the ADAS 22 is deactivated. The steering wheel 30 is in a non-rotating state when the ADAS 22 is activated. The steering wheel 30 is inhibited from rotating in the non-rotating state. The steering wheel 30 is in the non-rotating state when the steering wheel 30 is operatively decoupled from the steering shaft 52. In at least one embodiment, when the ADAS 22 is activated, the steering shaft 52 counter rotates such that no rotation of the steering wheel 30 is caused by the performance of steering maneuvers controlled by the ADAS 22. It is to be appreciated that "decoupling" the steering wheel 30 from the steering shaft 52 may be done mechanically, electrically, or a combination thereof.

Referring to FIGS. 4-7, the steering wheel 30 includes a core 60 that may include radially spaced spokes, a rim 62 at least partially disposed about the core 60, a steering member 64 extending from the core 60, and a convenience feature 66. The convenience feature 66 is disposed on the steering wheel 30, more specifically disposed within or on the core 60.

Figure 5:
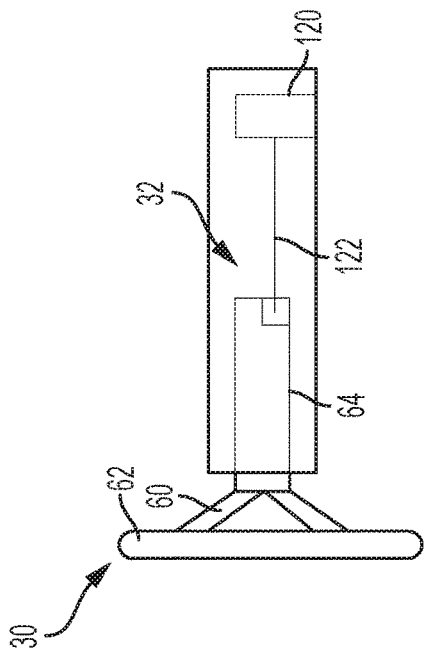
FIG. 5 is a schematic side view of the vehicle compartment having the steering system of FIG. 4 in a deployed position.
Figure 6:
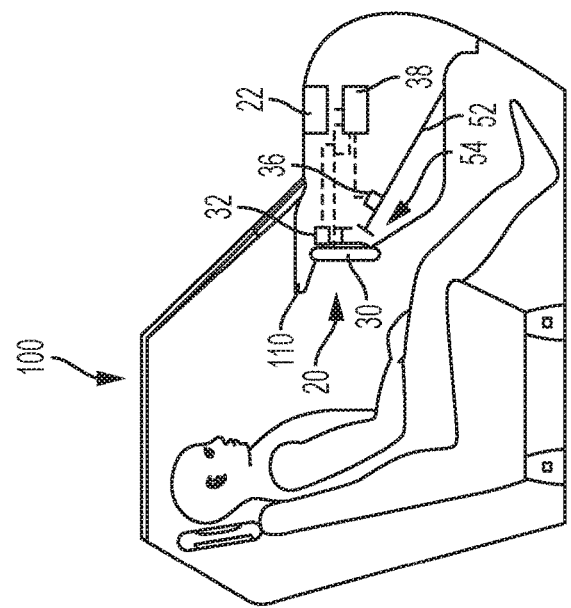
FIG. 6 is a schematic side view of an embodiment of a steering system in the retracted position.
Figure 7:
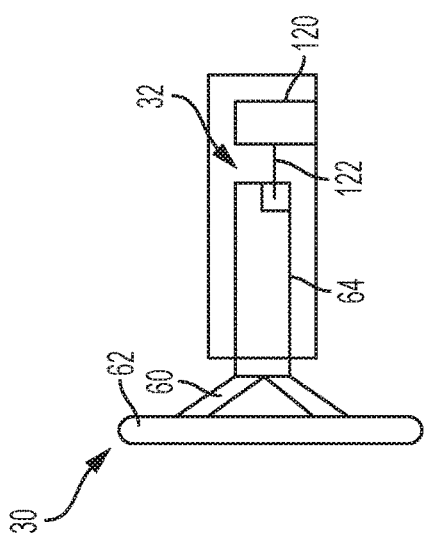
FIG. 7 is a schematic side view of the embodiment of the steering system of FIG. 6 in the deployed position.

Referring to FIGS. 4-7, the HW or steering wheel 30 is movable between a retracted position, FIGS. 4 and 6, and a deployed position, FIGS. 5 and 7, by the adjustment assembly 32. The retracted or stowed position corresponds to a position in which the steering wheel 30 is displaced away from the driver when the vehicle 1 is in the AD mode 10 and towards/into the selectively autonomous vehicle instrument panel 110. The retracted position provides increased space within the vehicle compartment 10 for the driver of the selectively autonomous vehicle to perform non-driving activities. In at least one embodiment, the steering wheel 30 is disposed below the selectively autonomous vehicle instrument panel eyebrow.

The deployed position corresponds to a driving position of the steering wheel 30 in which the steering wheel 30 is able to be rotated and the driver of the selectively autonomous vehicle is able to provide steering input to the steering wheel 30 to steer the selectively autonomous vehicle in the MD mode 12.

The adjustment assembly 32 is in communication with the controller 38. The adjustment assembly 32 includes an actuator 120 and an extension member 122. The actuator 120 is disposed proximate the steering column. In at least one embodiment, the actuator 120 is disposed within the selectively autonomous vehicle instrument panel 110. The actuator 120 is at least one of an electronic actuator, a hydraulic actuator, a pneumatic actuator, or the like.

The extension member 122 is operatively coupled to the actuator 120 and at least one of the steering wheel 30 and the steering shaft 52. The extension member 122 is at least one of a lead screw, a sliding shaft, or the like. The actuator 120 and the extension member 122 are arranged to move the steering wheel 30 between the deployed position and the retracted position.

In the absence of a request to activate the ADAS 22, the steering wheel 30 and steering assembly 20 is in the deployed position. The adjustment assembly 32 is configured to move the steering wheel 30 from the retracted position towards the deployed position in response to a request to deactivate the ADAS 22. As the steering wheel 30 moves towards the deployed position or subsequent to the steering wheel 30 achieving the deployed position, the coupling mechanism 54 operatively couples the steering wheel 30 to the steering shaft 52.

The adjustment assembly 32 is configured to move the steering wheel 30 from the deployed position towards the retracted position in response to a request to activate the ADAS 22. As the steering wheel 30 moves towards the retracted position or prior to the steering wheel 30 moving towards the retracted position, the coupling mechanism 54 operatively decouples the steering wheel 30 from the steering shaft 52.

The adjustment assembly 32 is commanded, by the controller 38, to move the steering wheel 30 from the deployed position towards the retracted position based on the cabin environmental signal indicating a clear path of travel of the steering wheel by the cabin environmental signal not indicating at least one of the above identified conditions, while the ADAS 22 is deactivated and the steering wheel 30 is operatively coupled to the steering shaft 52. In at least one embodiment, the adjustment assembly 32 is commanded, by the controller 38, to move the steering wheel 30 from the deployed position towards the retracted position based on a sensor associated with the ADAS 22 not indicating an unsafe condition external to the vehicle compartment 10.

Figure 8:
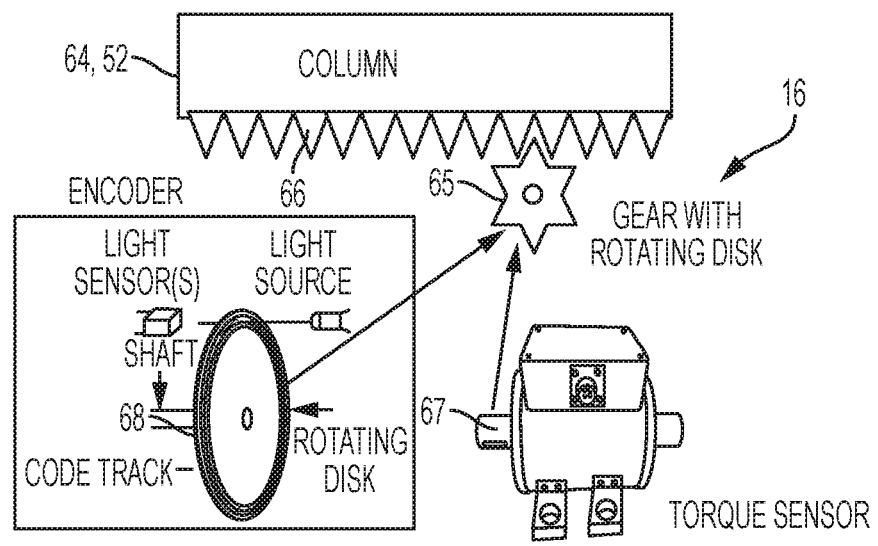
FIG. 8 is schematic illustration of the elements of an embodiment of a torque-displacement force sensor for a steering system.
Figure 9:
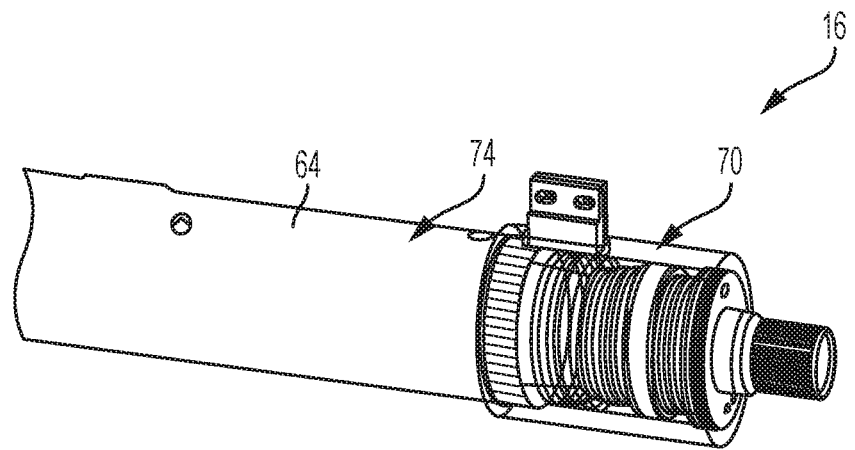
FIG. 9 is perspective assembled view of a magnetic flux/displacement force sensor.
Figure 10:
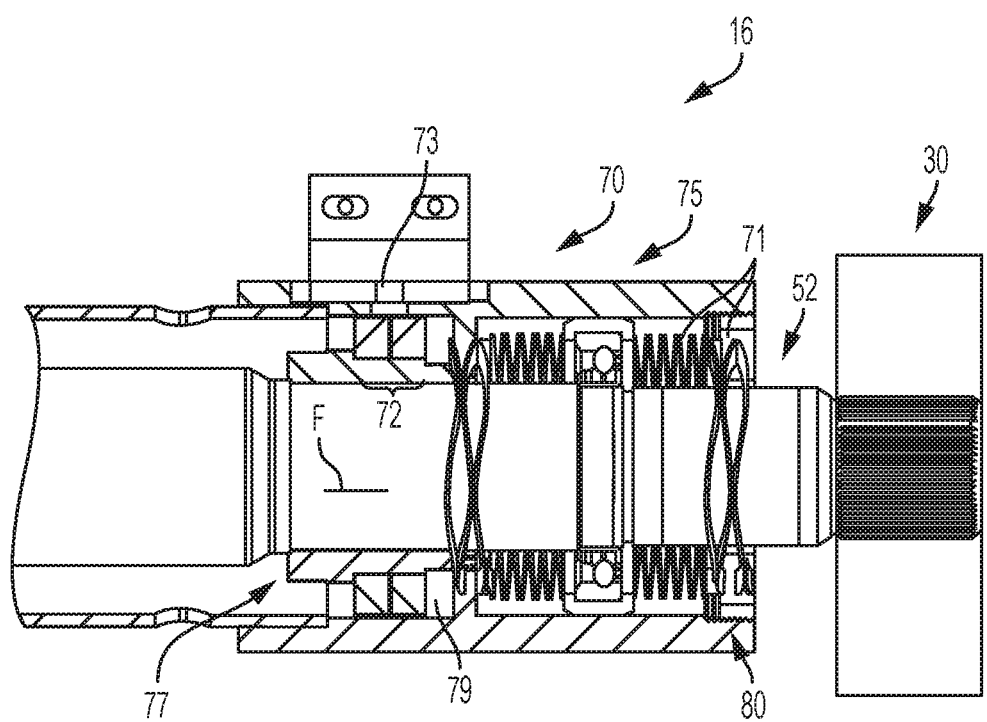
FIG. 10 is perspective cross-section view of the magnetic flux/displacement force sensor of FIG. 9.
Figure 11:
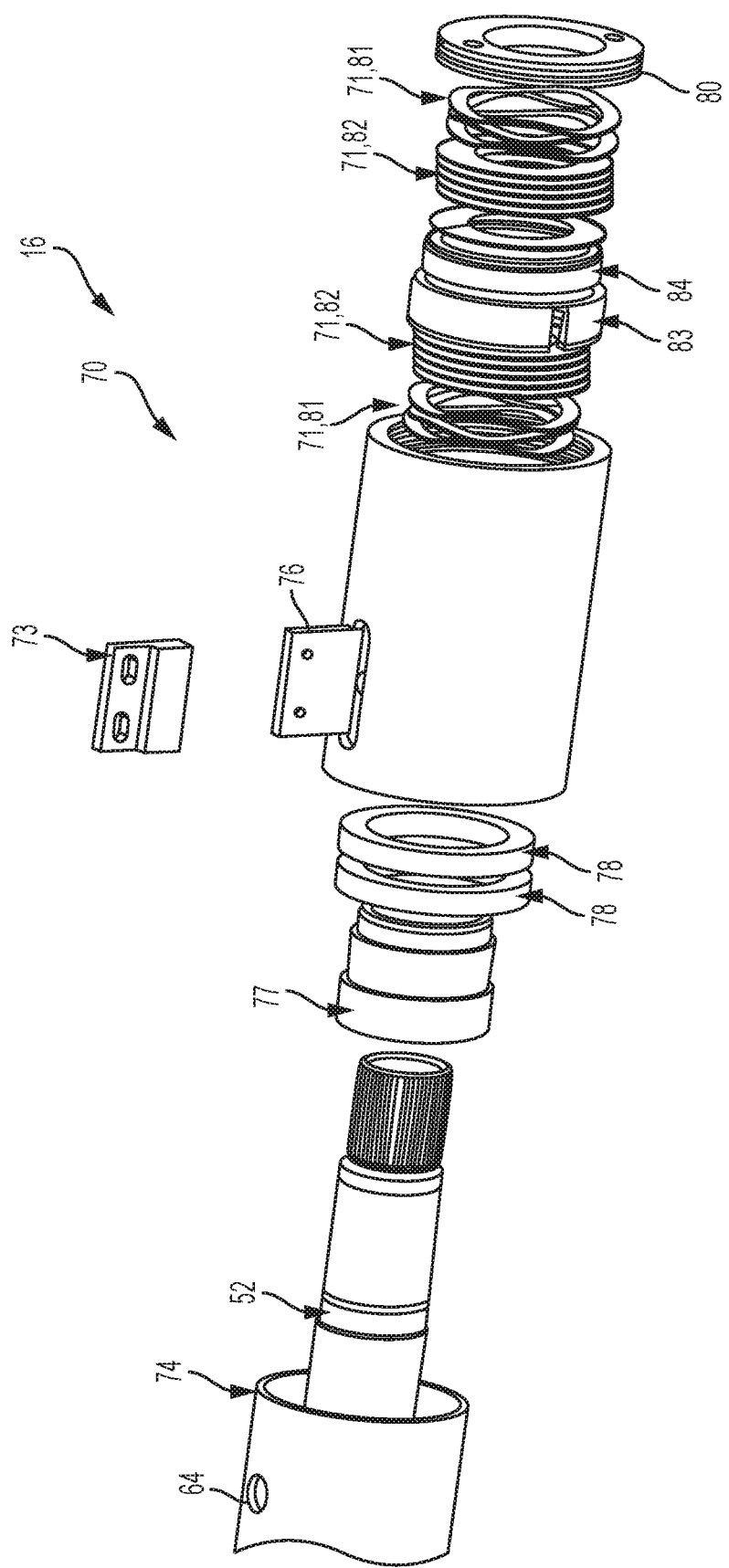
FIG. 11 is perspective exploded view of the unassembled components of the magnetic flux/displacement force sensor of FIG. 9.
Figure 12:
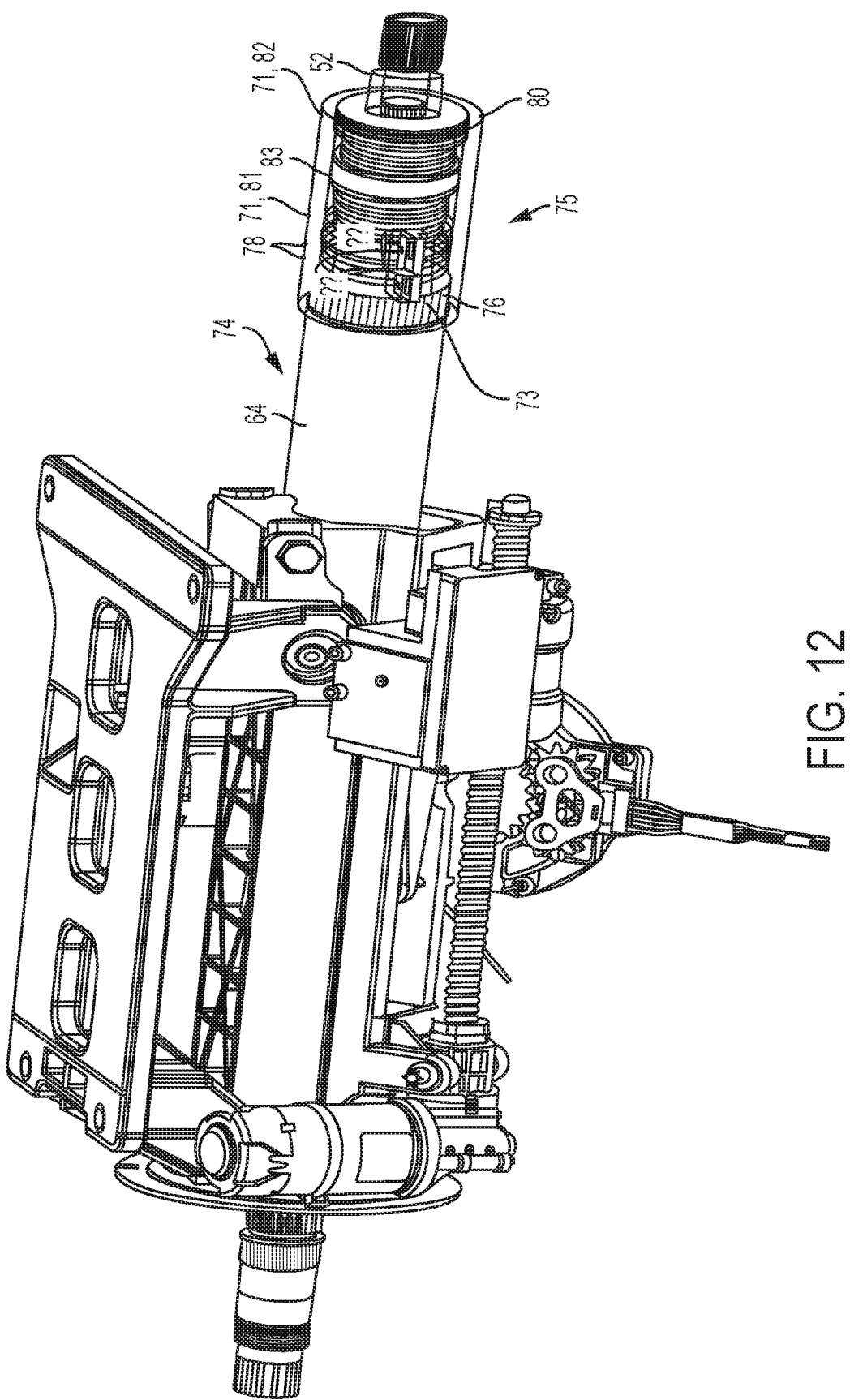
FIG. 12 is perspective view of a steering column that includes the magnetic flux/displacement force sensor of FIG. 9.
Figure 13:
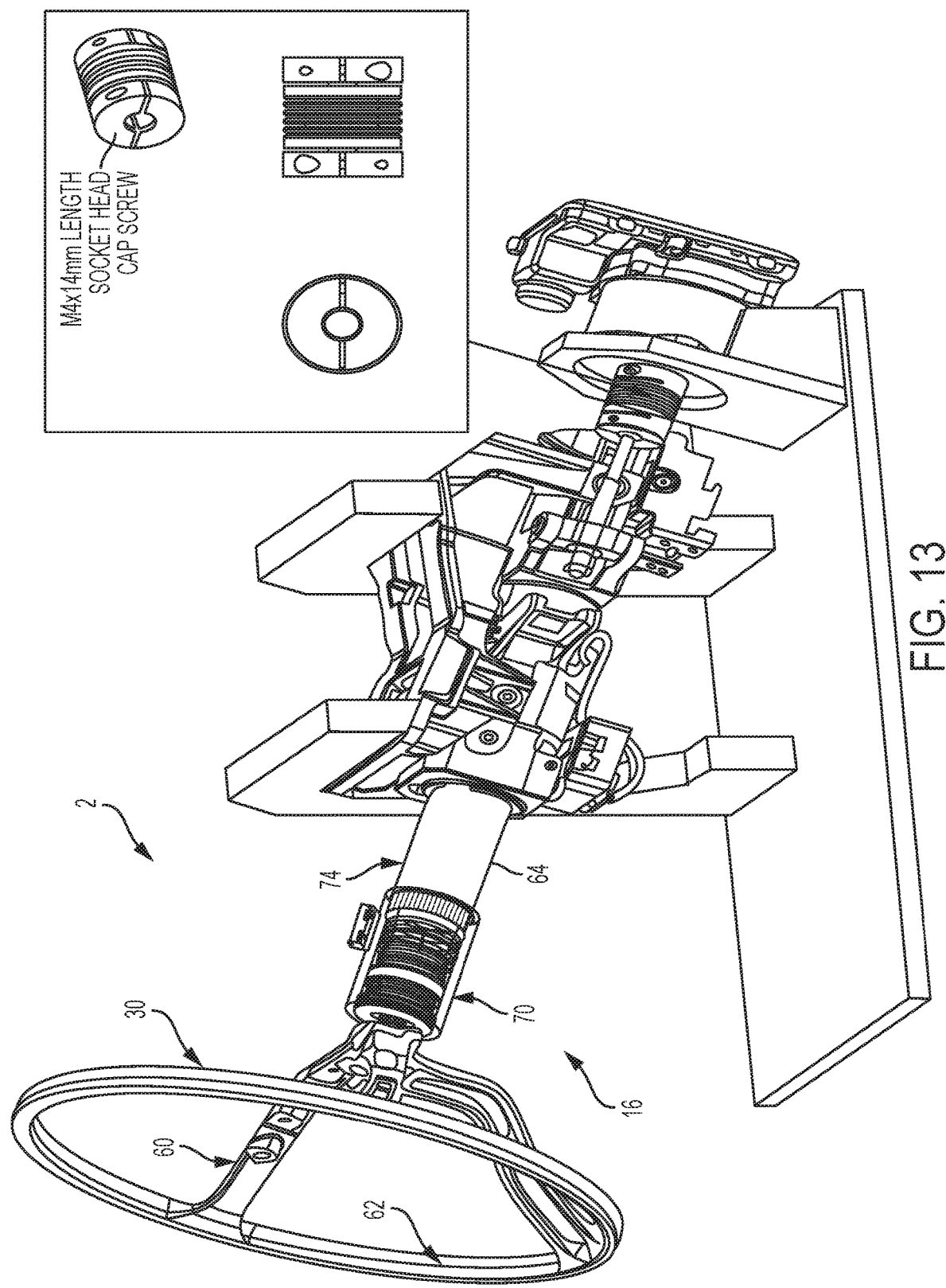
FIG. 13 is perspective view of an embodiment of a steering system that includes the magnetic flux/displacement force sensor of FIG. 9.

The SFSD 16 may be any suitable force sensor capable of sensing an axial force applied to the HW 30 and column assembly 20. In one embodiment, the SFSD 16 comprises a torque-displacement sensor 36 (FIG. 8). The SFSD 16 is in signal communication with the controller 38. The torque-displacement sensor 36 is disposed proximate at least one of the steering wheel 30 and the steering shaft 52. The torque-displacement sensor 36 is configured to output a signal, to the controller 38, indicative of a torque applied to the steering wheel 30 about the steering column axis. The torque-displacement sensor 36 is configured to output a signal, to the controller 38, indicative of displacement of the steering wheel 30 along the steering column axis. The adjustment assembly 32 is commanded, by the controller 38, to move the steering wheel 30 from the deployed position towards the retracted position in response to the application of at least one of a torque greater than a torque threshold and a displacement greater than a displacement threshold while the ADAS 22 is activated, the steering wheel 30 is in the retracted position, and the steering wheel is operatively decoupled from the steering shaft 52. In response to the movement of the steering wheel 30 from the deployed position towards the retracted position, the coupling mechanism 54 is configured to operatively couple the steering wheel 30 to the steering shaft 52.

The SFSD 16 comprising the torque-displacement sensor 36 of FIG. 8 converts axial displacement of the column assembly 20, such as steering column shaft member 64 or steering shaft 52, via a gear 65 and rack 66, to apply a torque to shaft 67 that may be encoded by encoder 67 to provide a torque signal that may be correlated in the controller 38 to axial displacement and force applied to the HW 30 and column assembly 20 using a lookup table, for example.

In another embodiment illustrated in FIGS. 9-12, the SFSD 16 comprises a magnetic flux/displacement sensor 70. The magnetic flux/displacement sensor 70 operates by enabling spring biased axial displacement of the steering shaft using one or more bias springs 71 so that a magnetic flux portion 72 can be displaced allowing a change in magnetic flux to be sensed by a magnetic flux sensor 73 that is configured to sense a change in magnetic flux, such as a Hall effect sensor. The magnetic flux/displacement sensor 70 is attached to an upper end of the outer jacket 74 of the steering column, such as steering member 64. The magnetic flux/displacement sensor 70 includes a housing 75. The housing 75 houses the components of the magnetic flux/displacement sensor 70 either on an outer surface that includes a protruding tab 76 for attachment of magnetic flux sensor 73 by fasteners, or by enclosing the sensor components that are disposed on the steering shaft 52. These sensor components include a magnet bushing 77 that has an inner diameter that is pressed onto the steering shaft 52 and that has disposed (e.g., pressed) on an outer diameter one or more permanent magnets 78, such as ceramic ring magnets. The springs 71 are disposed so as to be compressible on the outer surface of the steering shaft in between a formed flange 79 that protrudes inwardly into the housing cavity and a cap nut 80 that encloses the otherwise open end of housing 75. The springs 71 may include any suitable spring type including various coil springs, and in one embodiment include a plurality of wave springs 81 or Belleville washers 82, or a combination thereof as illustrated. The housing 75 also includes a pressed bushing 83 that has a shaft bearing 84 pressed into an inner diameter thereof. The bushing 83 and bearing 84 are disposed between the springs 71 with a predetermined amount of compressive bias applied. Application of an axial compressive force (F) by an operator along the steering shaft 52 toward the upper jacket 74 compresses the springs 71 further between the flange 79 and nut 80, thereby moving the permanent magnet 78 and creating a change in magnetic flux proportionate to the displacement proximate the magnetic flux sensor 73, such that the flux sensor communicates a signal indicative of the change in flux/displacement to a controller, such as controller 38. Likewise, application of an axial tensile force (F) by an operator along the steering shaft 52 toward the HW 30 decompresses the prebiased springs 71 between the flange 79 and nut 80, thereby moving the permanent magnet 78 in the opposite direction and also creating a change in magnetic flux proportionate to the displacement proximate the magnetic flux sensor 73, such that the flux sensor communicates a signal indicative of the change in flux/displacement to a controller, such as controller 38. By using springs 71 with a predetermined spring rate, the changes in flux/displacement can be used to determine the axial force using known methods. The compressive/tensile (extensive) displacement of the steering shaft 52 can be accommodated by an axially flexible coupling 85 disposed at the lower end of the shaft, such as bellows 86.

Figure 14:
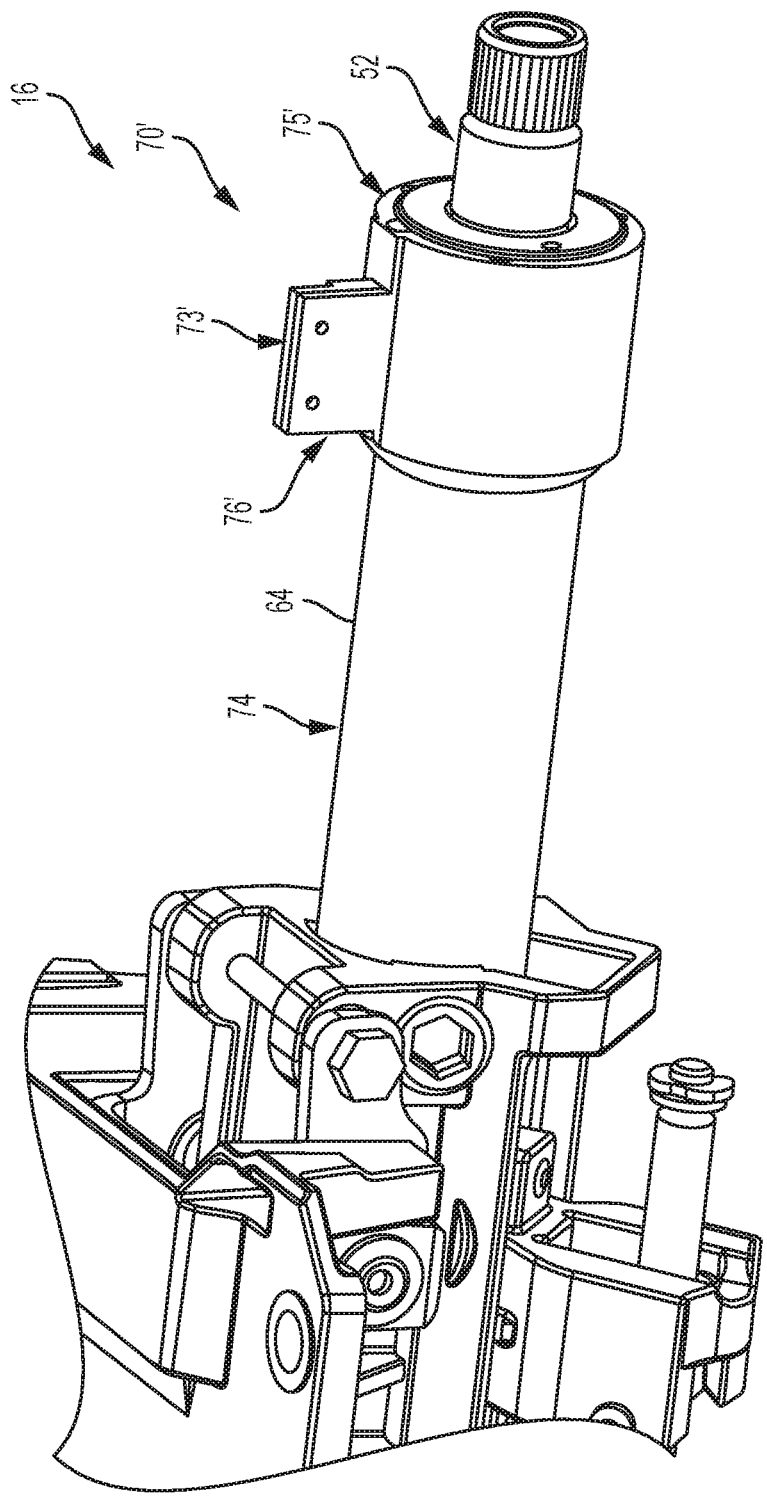
FIG. 14 is perspective assembled view of a magnetic flux/displacement force sensor according to another aspect of the disclosure.
Figure 15:
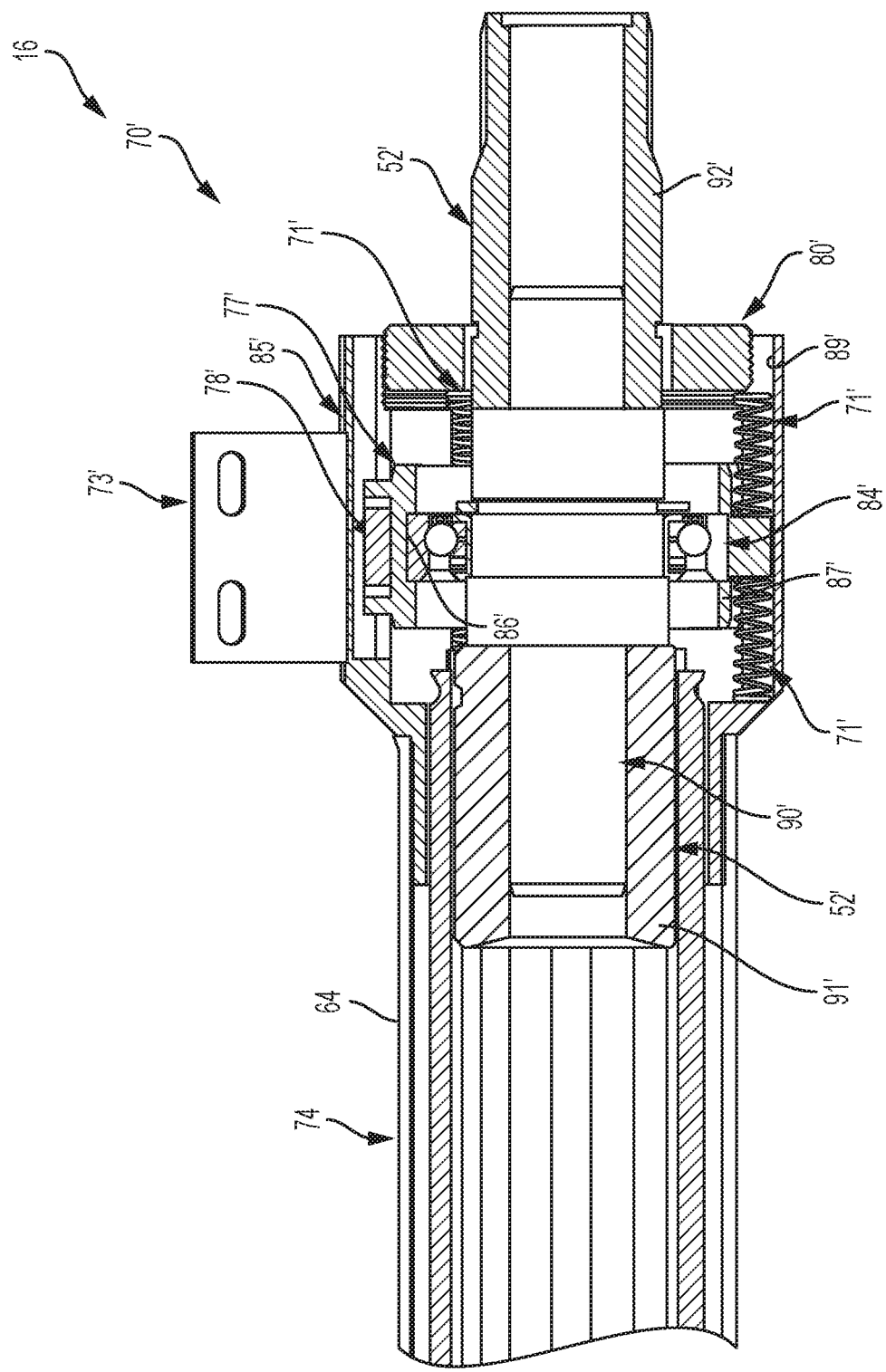
FIG. 15 is perspective cross-section view of the magnetic flux/displacement force sensor of FIG. 14.

In another embodiment illustrated in FIGS. 14-16, the SFSD 16 also comprises a magnetic flux/displacement sensor 70'. The magnetic flux/displacement sensor 70' operates by enabling spring biased axial displacement of the steering shaft 52' using one or more bias springs 71' so that a magnetic flux portion 72' can be displaced allowing a change in magnetic flux to be sensed by a magnetic flux sensor 73' that is configured to sense a change in magnetic flux, such as a Hall effect sensor. The magnetic flux/displacement sensor 70 is attached to an upper end of the outer jacket 74 of the steering column, such as steering member 64. The magnetic flux/displacement sensor 70' includes a housing 75'. The housing 75' houses the components of the magnetic flux/displacement sensor 70' either on an outer surface that includes a protruding tab 76' for attachment of magnetic flux sensor 73' by fasteners, or by enclosing the sensor components that are disposed on or around the steering shaft 52'. These sensor components include a magnet bushing 77' that has an inner diameter that is pressed onto the steering shaft 52' and that has disposed (e.g., pressed) into a magnet pocket 86 on an outer diameter one or more permanent magnets 78', such as ceramic magnets. The springs 71' are disposed so as to be compressible (inwardly or outwardly as the case may be) within bushing spring pockets 87', formed in the outer surface of the bushing 77', and housing spring pockets 89', formed in the inner surface of cylindrical housing 75', that are radially spaced around the outer surface of the steering shaft 52' with corresponding pairs of the pockets in concentric correspondence with one another. The springs 71' may include any suitable spring type, including various coil springs, elastomeric springs, and the like having a predetermined spring rate that are configured to be compressed within the respective pockets. The bushing 77' also houses a pressed shaft bearing 84' having an outer diameter that is pressed into an inner diameter of the bushing. The inner diameter of the bearing 84' is pressed onto a shaft extension 90' that is in turn pressed into an inner diameter of respective lower portion 91' and upper portion 92' of the steering shaft 52' proximate an upper or outermost end of the shaft. The steering shaft 52' is slidably disposed with an anti-rotation feature, such as a splined joint, within an upper splined end of inner jacket 93' that is in turn concentrically disposed within outer jacket 74. The shaft extension 90' facilitates assembly of various components of the magnetic flux/displacement sensor 70'. The bearing 84' is disposed between opposed sets of the springs 71' that are disposed in an axially extending, radially spaced, and in one embodiment equally radially spaced, arrays on opposite sides of the bearing 84' with a predetermined amount of compressive bias applied by insertion and tightening of the threaded nut 80'. Application of an axial compressive force (F) by an operator along the steering shaft 52' toward the upper jacket 74 compresses the springs 71' disposed between the bearing 84' and upper jacket 74 between the bushing 77' and jacket 74, thereby moving the permanent magnet 78' and creating a change in magnetic flux proportionate to the displacement proximate the magnetic flux sensor 73', such that the flux sensor communicates a signal indicative of the change in flux/displacement to a controller, such as controller 38. Likewise, application of an axial tensile force (F) by an operator along the steering shaft 52' toward the HW 30 compresses the prebiased springs 71' disposed between the bushing 77' and threaded nut 80', thereby moving the permanent magnet 78' in the opposite direction and also creating a change in magnetic flux proportionate to the displacement proximate the magnetic flux sensor 73', such that the flux sensor communicates a signal indicative of the change in flux/displacement to a controller, such as controller 38. By using springs 71' with a predetermined spring rate, the changes in flux/displacement can be used to determine the axial force using known methods. In this embodiment, the axial displacement needed to produce the signal output is provided by movement of the slidable steering shaft 52' within the inner jacket 93' upon application of compressive or tensile force. There is no need for an axially flexible coupling 85 disposed at the lower end of the shaft, such as bellows 86, as described in conjunction with the previous embodiment.

Figure 17:
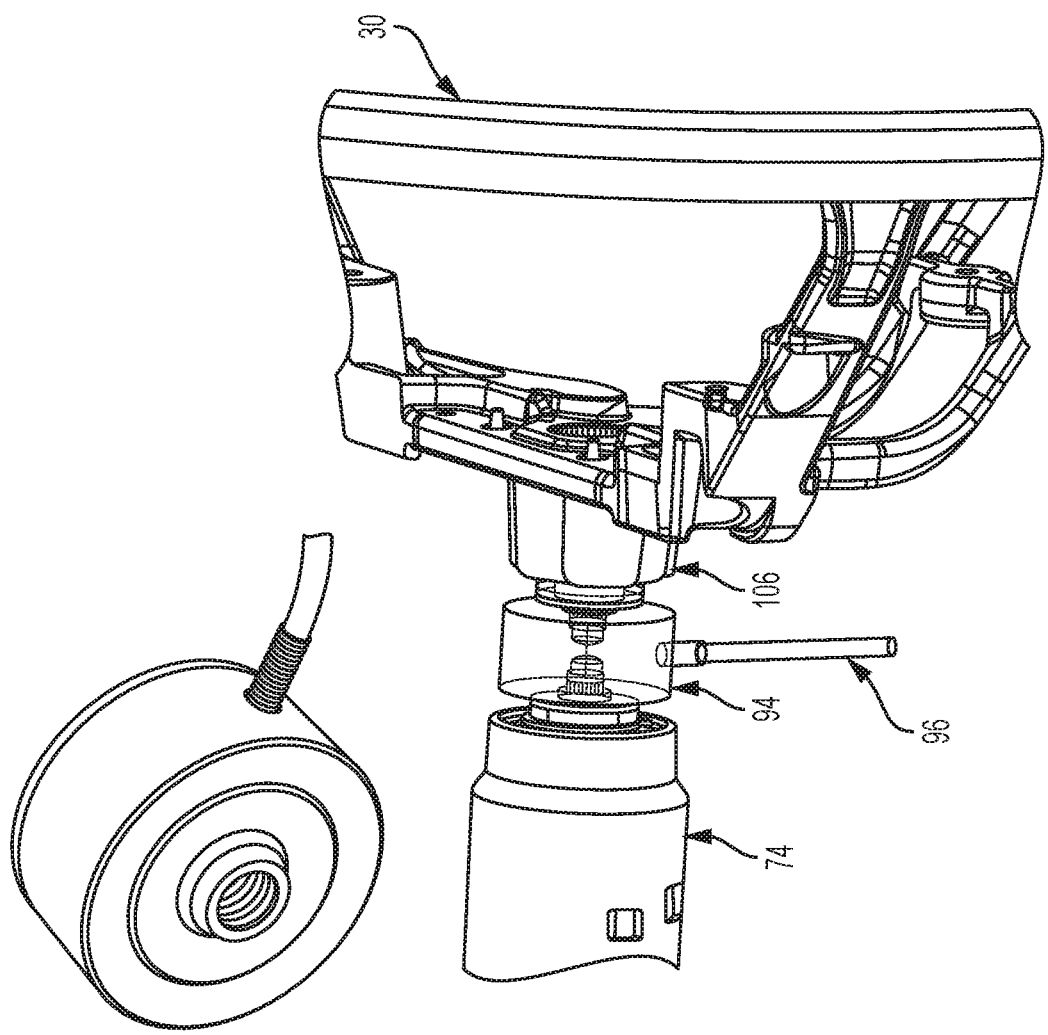
FIG. 17 is perspective view of an embodiment of a steering system that includes an embodiment of a load cell force sensor.
Figure 18:
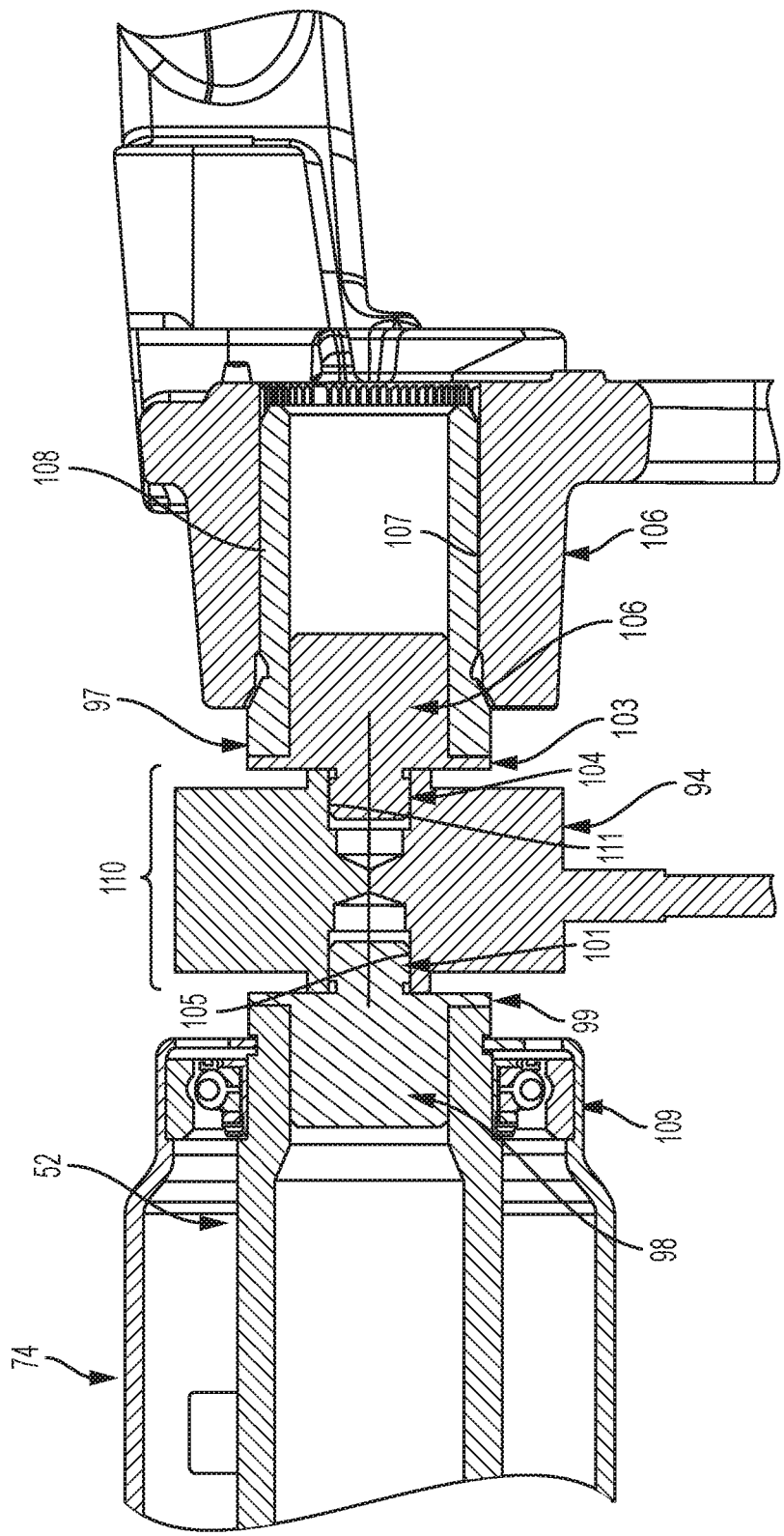
FIG. 18 is perspective cross-section view of the embodiment of the load cell force sensor of FIG. 17.

In still another embodiment illustrated in FIGS. 17 and 18, the SFSD 16 comprises a load cell force sensor 94 of conventional construction, which in one embodiment may include internal strain gauges that are configured to provide a signal output through wiring harness 96, which is axially disposed in steering shaft 52 proximate an upper end thereof. In one embodiment, a portion 110 of the steering shaft 52 is removed leaving the truncated steering shaft 52 and shaft end portion 97. The inner diameter of the truncated end of truncated steering shaft 52 is threaded and configured to receive a matingly threaded lower adapter 98 that includes flange 99 and threaded load cell attachment portion 101. Lower adapter 98 is threaded into truncated end of truncated steering shaft 52, and in one embodiment the flange 99 abuts the truncated end. The inner diameter of the truncated end of the shaft end portion 97 is also threaded and configured to receive a matingly threaded upper adapter 102 that includes flange 103 and threaded load cell attachment portion 104. Upper adapter 102 is threaded into truncated end of shaft end portion 97, and in one embodiment the flange 103 abuts the truncated end. The load cell force sensor 94 has a lower threaded bore 105 that is configured to matingly receive the threaded load cell attachment portion 101. The load cell force sensor 94 has an upper threaded bore 111 that is configured to matingly receive the threaded load cell attachment portion 104. In this embodiment, as in all embodiments, steering wheel 30 may be attached to the upper end of steering shaft, in this embodiment the end of shaft end portion 97, through a hub 106 and splined hub bore 107 that is configured to receive splined shaft portion 108 and provide an anti-rotation feature with respect to the steering shaft 52 and hub 106. An upper jacket bearing 109 is pressed onto the outer surface of steering shaft 52 and into the inner surface of upper jacket 74.

Referring again to FIGS. 4-7, the controller 38 may be provided as part of the ADAS 22. In at least one embodiment, the controller 38 embodies the ADAS 22. In at least one embodiment, the controller 38 is provided as a separate component from the ADAS 22 and is in communication with the autonomous vehicle, the autonomously driven vehicle, or the selectively autonomous vehicle. The controller 38 is in communication with a plurality of vehicle sensors including the cabin environmental sensor 130 of the environmental detection system 34 as well as other vehicle sensors in communication with the ADAS 22, such as occupant detection sensors, forward object detection sensors, rearward object detection sensors, ultrasonic sensors, etc.

The controller 38 interprets the various signals provided by the steering assembly 20, the ADAS 22, and the plurality of vehicle sensors to determine whether to activate or deactivate the ADAS 22 and output various warnings or alerts. The controller 38 issues commands to and receive signals from the steering wheel 30, the adjustment assembly 32, the SFSD 16, such as torque-displacement sensor 36, and the steering shaft 52. These commands and signals may result in the steering wheel 30 being operatively coupled or operatively decoupled from the steering shaft 52, the steering wheel 30 being in a retracted position or a deployed position, the steering wheel 30 being in a rotating condition or a non-rotating or quiet condition, and the output of indicators to the driver of the selectively autonomous vehicle.

In one embodiment, the controller 38 and SOD SbW controller 4 may be the same controller. In other embodiments, the controller 38 and SOD SbW controller 4 may be separate controllers that are in communication with one another.

The controller 38 includes a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable software instructions, used by the controller 38 in controlling the steering assembly 20 and the ADAS 22.

The vehicle 1, SOD SbW steering system 2 and UX-AD2MD system 14 described herein are advantageously configured to redeploy from a stowed position or stow from a deployed position using the hardware and software control algorithms described herein without the need of a camera and biometric sensing algorithms. The vehicle 1, SOD SbW steering system 2 and UX-AD2MD system 14 advantageously implement the SWSAS system 9 described herein to affect deployment/retraction as described herein. The vehicle 1, SOD SbW steering system 2 and UX-AD2MD system 14, and the SWSAS system 9 described herein provide a safe and reliable interactive driver experience, which include Hands-on/off detection, a haptic handshake to confirm the initiation of the transition from AD mode to MD mode, as well as the transition from MD mode to AD mode. The vehicle 1, SOD SbW steering system 2 and UX-AD2MD system 14, and the SWSAS system 9 are configured to confirm that the driver is able to safely resume driving in MD mode by ensuring that the HW 30 position and position changes track the road wheel 9 position and position changes as a function of time.

Figure 19:
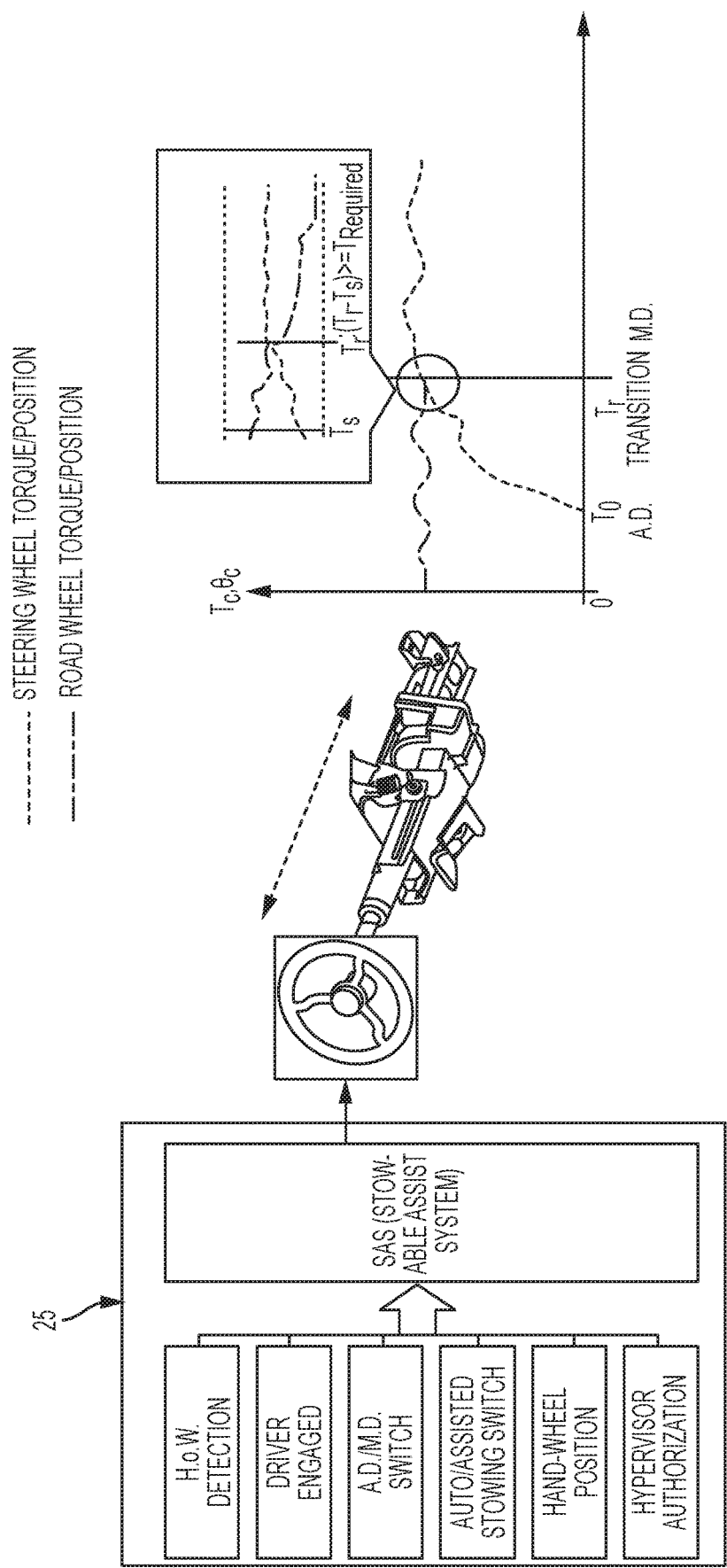
FIG. 19 is a schematic illustration of a hypervisor algorithm and elements thereof.
Figure 20:
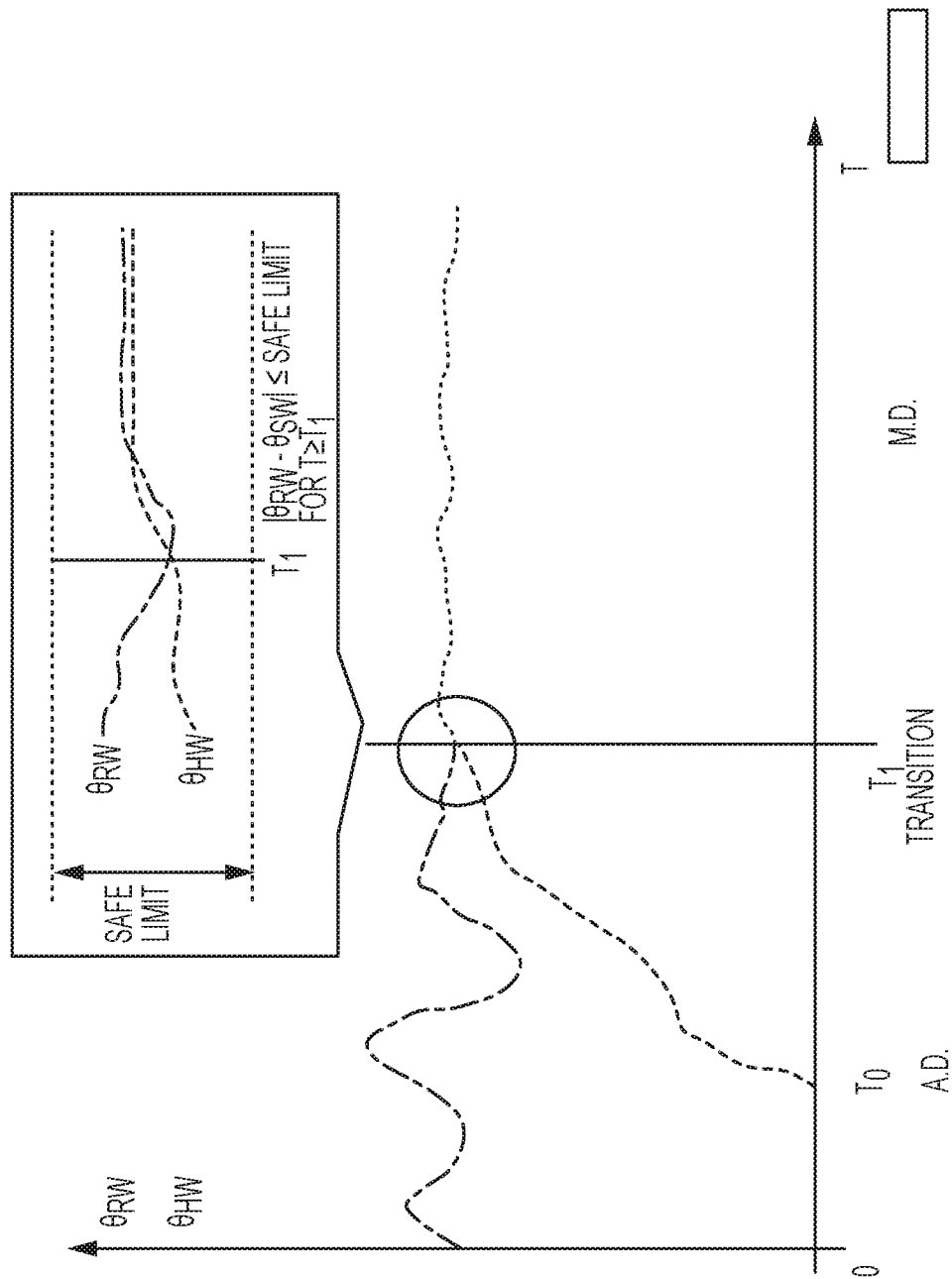
FIG. 20 is a plot of handwheel and road wheel angular position as a function of time during operation of a steering system during the time interval during which a transition from an autonomous driving (AD) mode to a manual driving (MD) mode is allowed by the system.

Referring to FIGS. 19 and 20, the SbW Hypervisor algorithm 120 provides a further level of protection for the driver by fusing the input of a plurality of sensors and control authorizations to allow the transfer of the driving responsibilities from autonomous driving system driving in AD mode to the driver. For example, the hypervisor algorithm fuses and compares the handwheel angle from the corresponding angular position sensor as a function of time with the road wheel angle from the corresponding road wheel angular position sensors as a function of time to determine whether a convergence threshold of these values has been achieved that is suitable, particularly safe, for the steering system to return control of the SOD SbW steering system to the driver. In one embodiment, convergence is determined by determining that the difference in angular position between the hand wheel 30 and the road wheels 5 is less than a threshold value determined to be a safe limit of angular difference at a time $T_1$, such that transfer of control to MD mode is affected at a time $T \geq T_1$.

The accurate determination of the driver's engagement is fundamental in the robot's decision to cede the control of the vehicle 1 to the driver. As noted above, in most instances, this activity is performed by diverse camera-based systems and/or personal privacy intrusive biometric technologies. The present invention avoids these inconveniences in leveraging all the steps involved in the user experience (UX) deployed during the driver-initiated AD mode to MD mode transition. This is implemented through the Steering Wheel Stow Assist System (SWSAS) 9. In addition to the comfort conferred by the assist system, the continuous grip on the hand-wheel provides confidence in the success of the transition between driving modes, as described herein, whether AD mode to MD mode or MD mode to AD mode.

Figure 21:
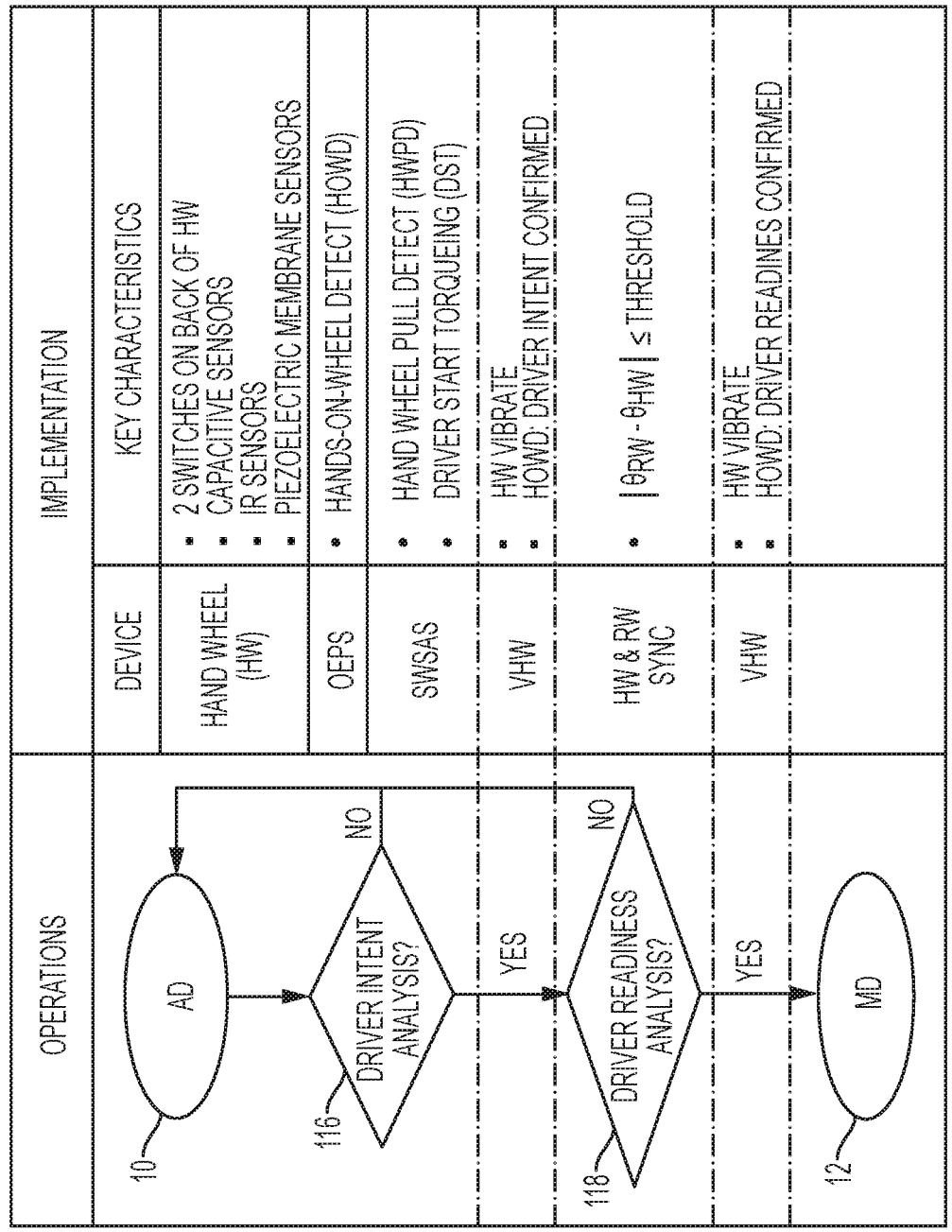
FIG. 21 is a flowchart of a SWSAS and a method of using the same.
Figure 22:
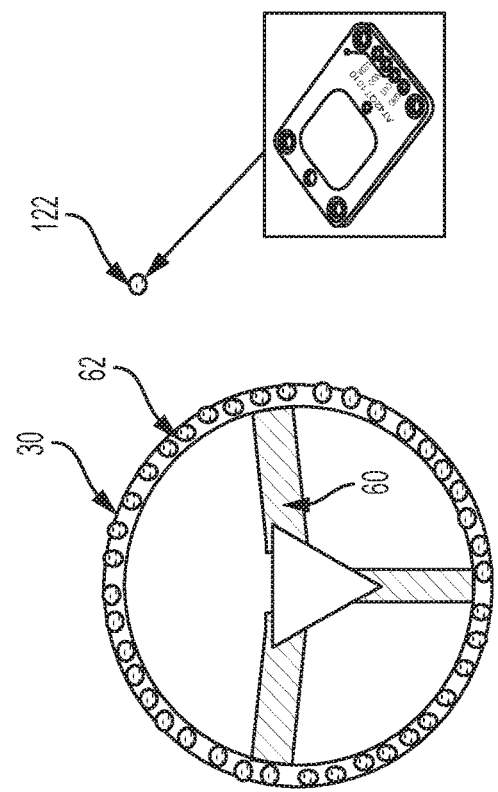
FIG. 22 is a rear schematic view of a hand wheel having a hand on wheel sensor comprising a plurality of electrical switches.
Figure 23:
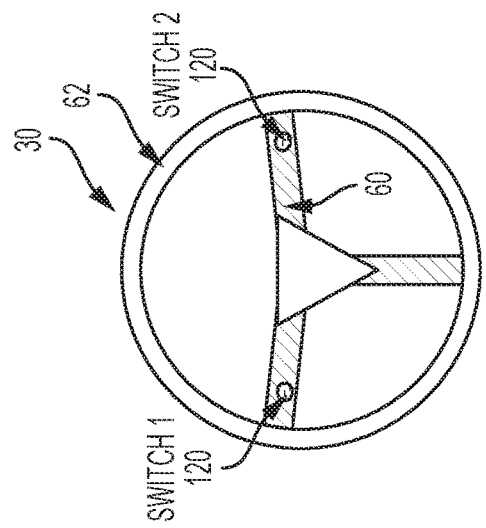
FIG. 23 is a rear schematic view of a hand wheel having a hand on wheel sensor comprising a plurality of capacitive switches in a peripheral array.
Figure 25:
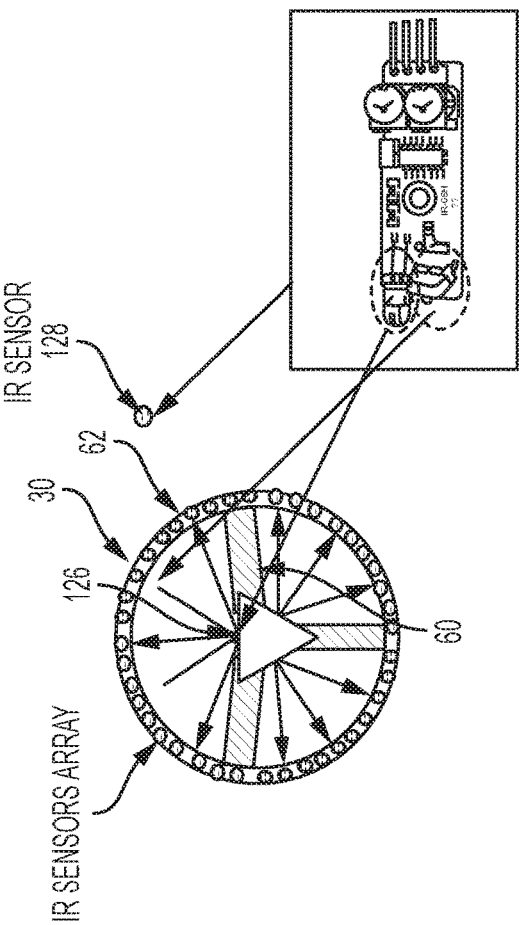
FIG. 25 is a rear schematic view of a hand wheel having a hand on wheel sensor comprising an optical sensor comprising a plurality of infrared switches in a peripheral array.
Figure 24:
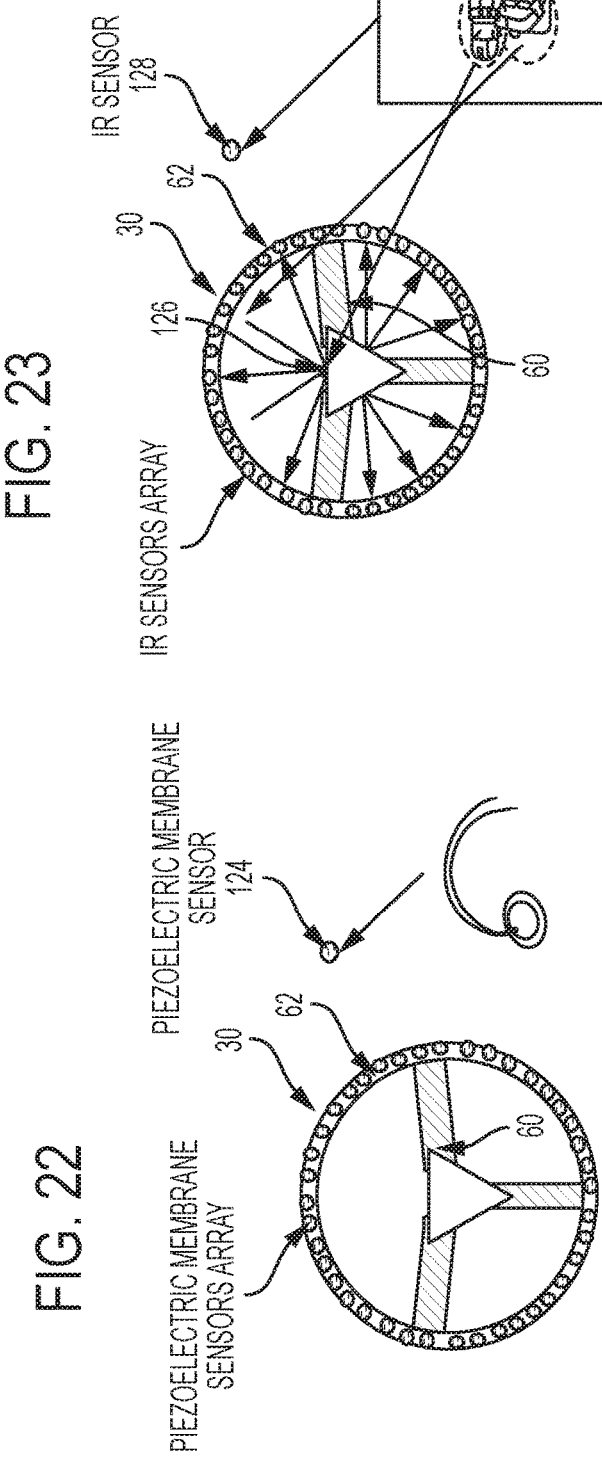
FIG. 24 is a rear schematic view of a hand wheel having a hand on wheel sensor comprising a plurality of piezoelectric switches in a peripheral array.

FIG. 21 illustrates a method of using the SWSAS 9 and other vehicle 1 systems, including ADAS 22 and SOD SbW 2, to make the transition. FIG. 21 provides a simplified overview of the method of transitioning from AD to MD. The key stages are performance using a controller of a method comprising a Driver's Intent Analysis (DIA) 116 and a method comprising a Driver's Readiness Analysis (DRA) 118.

Referring to FIGS. 21-25, the DIA will be executed upon concurrence of fool-proof redundant sensing devices located at: 1) the Hand Wheel (HW) 30 that will be equipped with at least two of the following sensors: a) two switches 120 located at the back of the HW (FIG. 22); b) a plurality, comprising in one embodiment, a peripherally extending array of spaced apart capacitive sensors 122 positioned at the back of the HW (FIG. 23); c) a plurality, comprising in one embodiment, a peripherally extending array of spaced apart piezoelectric membrane sensors 124 positioned at the back of the HW (FIG. 24); and d) an optical sensing system comprising a plurality, in one embodiment a peripherally extending array of spaced apart infrared transmitters 126 positioned along the outer perimeter of the hand wheel hub and (FIG. 25) a corresponding array of IR receivers 128 distributed along the inner perimeter of the hand wheel rim 62; 2) the CEPS generating the Hands On Wheel Detect (HODWD) signal; 3) the Steering Wheel Stow Assist System (SWSAS) including: the a) Hand Wheel Pull Detect (HWPD) by means of Longitudinal Force Sensor (LFS) signal, b) the Column Position Sensor (CPS) signal; and c) Column Tilt Sensor (CTS) signal; and 4) a Voice Command requesting manual override of the ADAS 22. The DIA concurrence of fool-proof redundant sensing devices may also optionally include: 1) confirmation through an interaction between the driver and system by means of: a) a haptic signal VHW generated by the CEPS. (i.e. the hand wheel 30 will vibrate to provide feedback to the driver.); b) driver acknowledgement in keeping his/her hands on the wheel; and/or c) a voice command acknowledging the transfer of driving responsibility.

The DRA will be executed upon: 1) reaching the convergence between the angular position $\Theta_{RW}$ and that of the hand wheel $\Theta_{HW}$. That is:

$$|\Theta_{RW} - \Theta_{HW}| \leq \text{Threshold} \quad (\text{Eq. 1})$$

2) confirmation through an interaction between driver and system by means of: a haptic signal VHW generated by the CEPS. (i.e. The hand wheel will vibrate to provide feedback to the driver.); 3) driver acknowledgement in keeping his/her hands on the wheel; and/or 3) a voice command acknowledging the transfer of responsibility.

Figure 26:
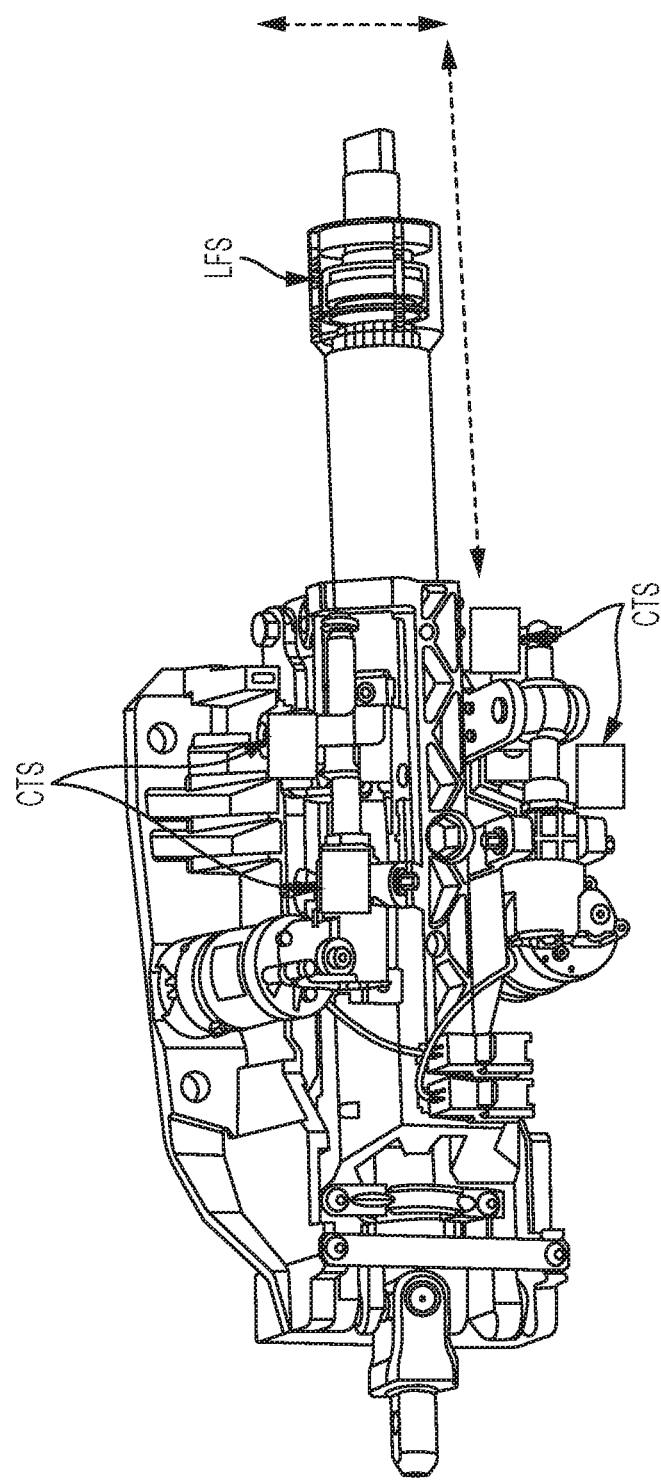
FIG. 26 perspective view of an embodiment of an SWSAS and a steering system.
Figure 27:
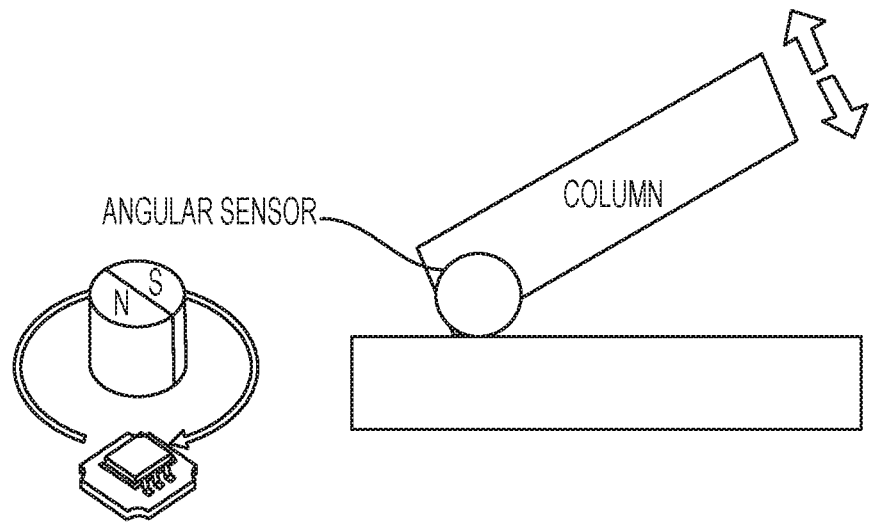
FIG. 27 is an embodiment of a column tilt sensor as disclosed herein.

The SWSAS 9 (FIG. 26) leverages the properties of a power column equipped with two electric motors for ensuring the longitudinal motion (stow in and out) and the tilt position of the column and the hand-wheel. The assist function is analogous to that of an electric power steering system, whereby the torque sensing is replaced by a longitudinal or axial force sensing principle. The steering column may be configured to a predetermined stiffness requirement and motion ranges, such as a customer stiffness requirement and motion ranges. In one embodiment, the steering column shall have a telescopic effort of 50 N or less, a time to stow and un-tow that is adjustable from 0.15 s to 10 s, and a time to tilt or un-tilt: from 0.15 s to 5 s. In order to enhance the adaptability of the SWSAS to a drivers operating style, in one embodiment the SWSAS will be equipped with the following sensors: 1) longitudinal or axial force sensor (LFS) as described herein to capture driver's telescopic effort; 2) a column position sensor (CPS) for measuring the hand-wheel depth (stow in and out); and a column tilt sensor (CTS) for the measuring the angle or height of the steering wheel relative to a reference position (e.g., the driver's seat see FIG. FIG. 27). In one embodiment, the CTS may include an angular sensor and the position of the column relative to the vehicle floor may be calculated from the column length.

Figure 28:
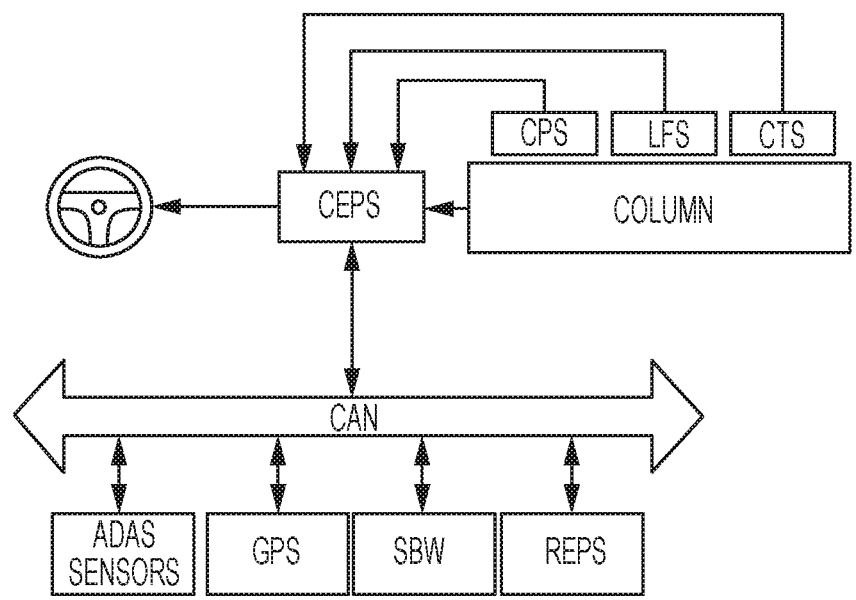
FIG. 28 is a schematic illustration of the SASS control architecture, wherein the SWSAS controller may be included in the CEPS.

Referring to FIG. 28, in one embodiment, the SWSAS controller may be included in the CEPS.

Figure 29:
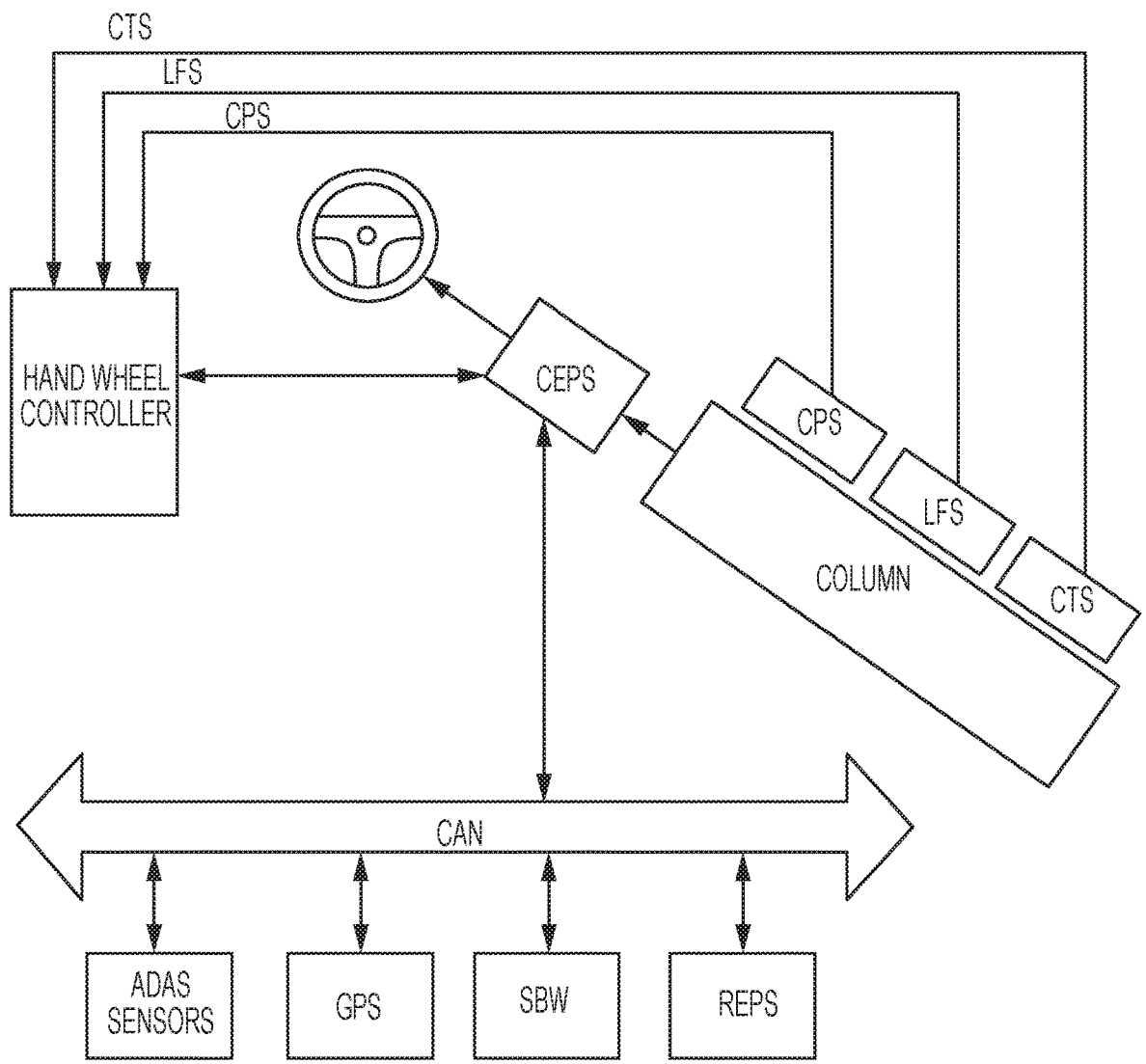
FIGS. 29 and 30 are schematic illustrations of embodiments of the SASS control architecture, wherein the SWSAS controller may be an independent controller and directly connected to the CEPS (FIG. 29) or an independent controller associated with and leveraging the CAN network (FIG. 30)
Figure 30:
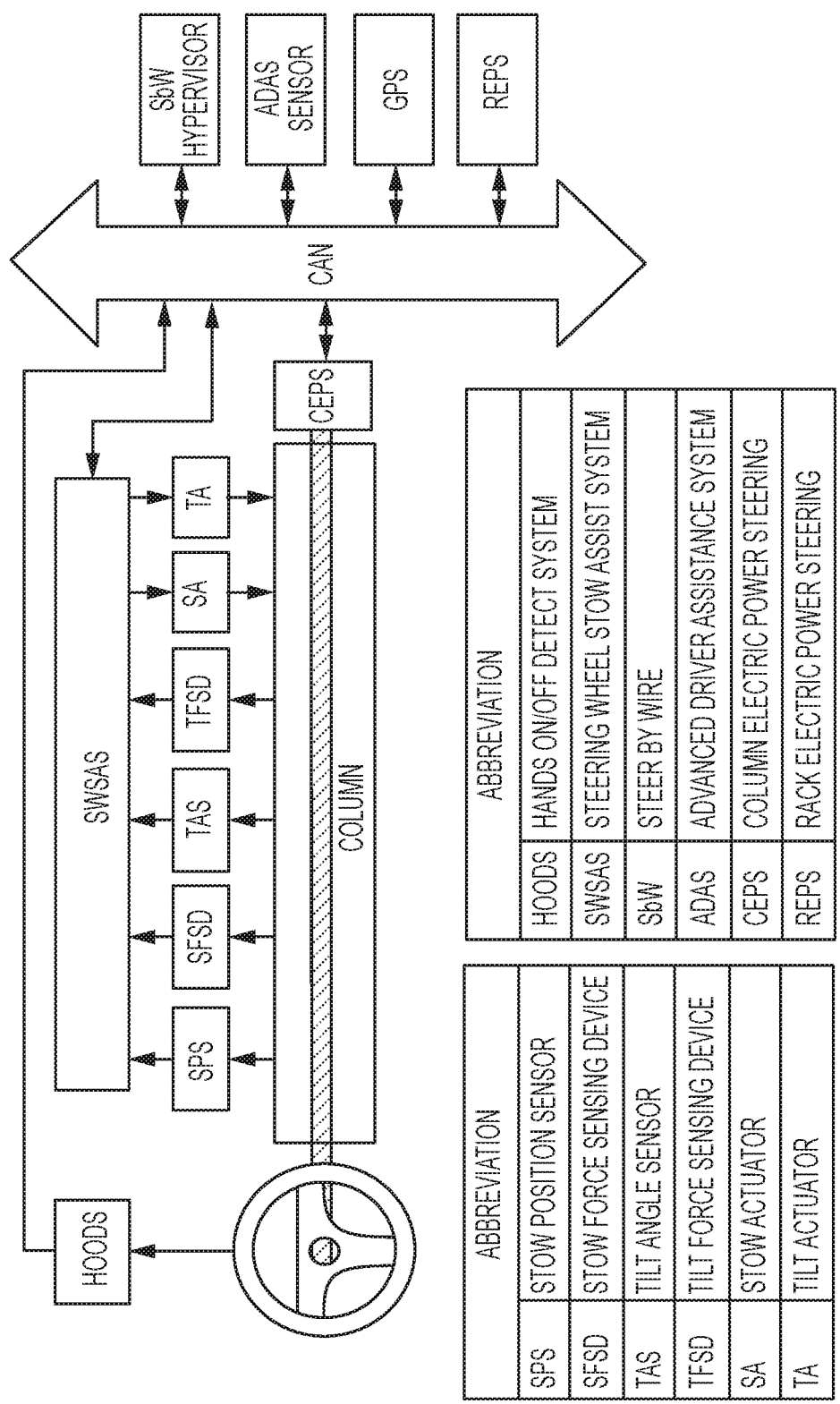

Referring to FIGS. 29 and 30, in one embodiment, the SWSAS controller may be an independent controller. With an independent controller, the controller may be directly connected to the CEPS (FIG. 29) or a controller associated with and leveraging the CAN network (FIG. 30).

Figure 31:
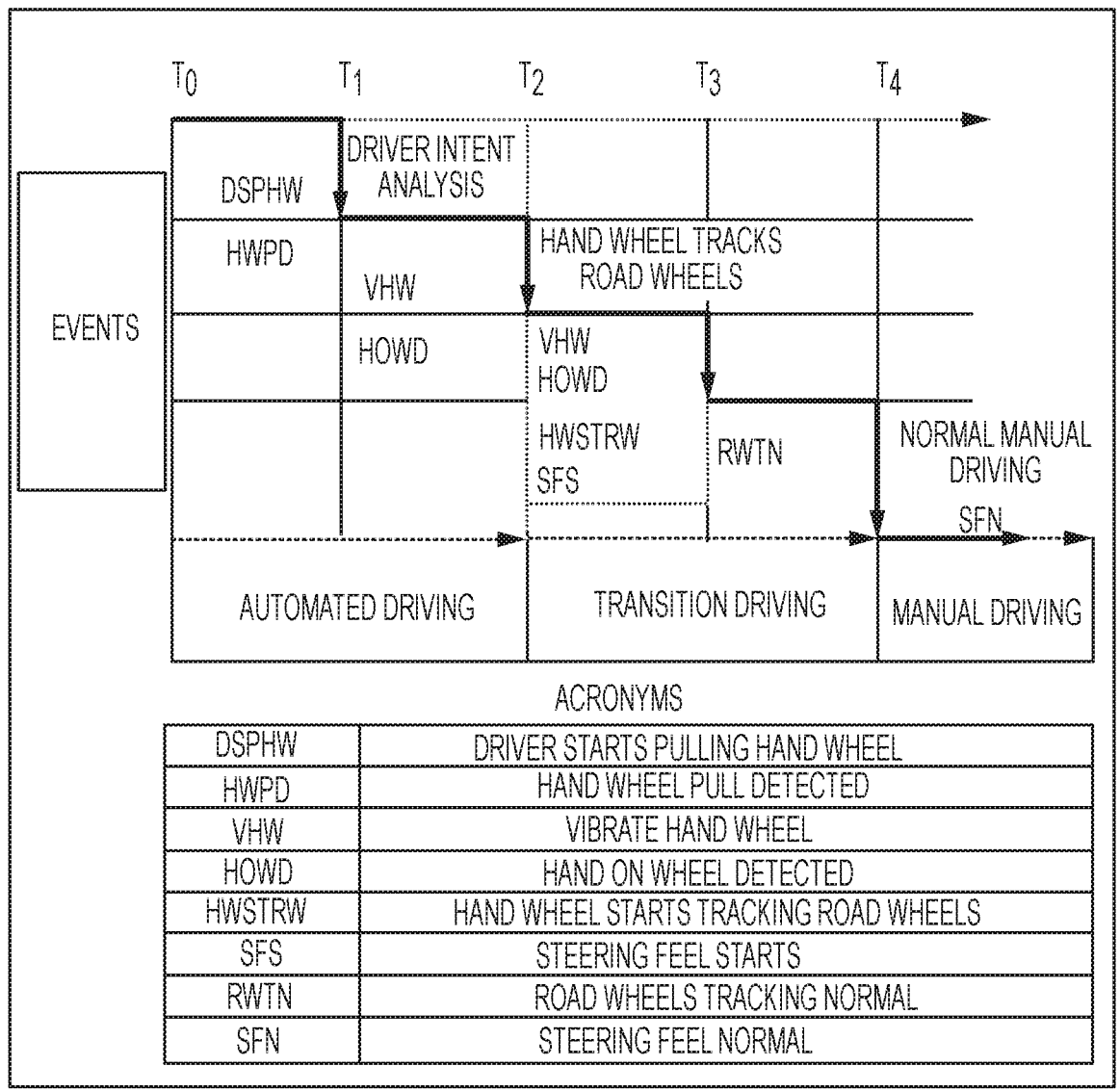
FIG. 31 is a Steering On Demand—User Experience Sequence of Events describing the transition from AD mode to MD mode provided as a function of time.
Figure 32:
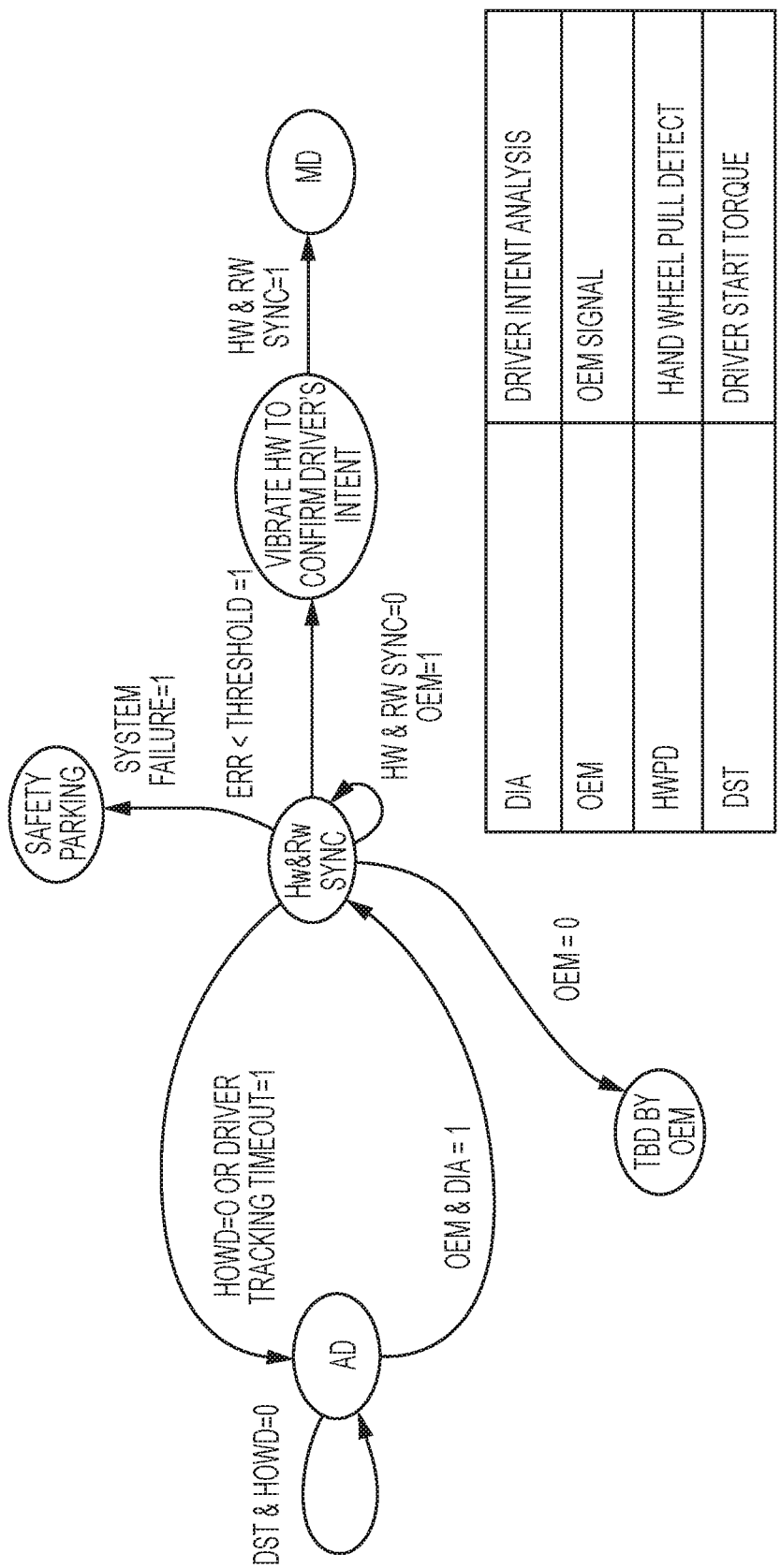
FIG. 32 is a state diagram of the SOD SbW steering system during an AD mode to MD mode transition.
Figure 33A:
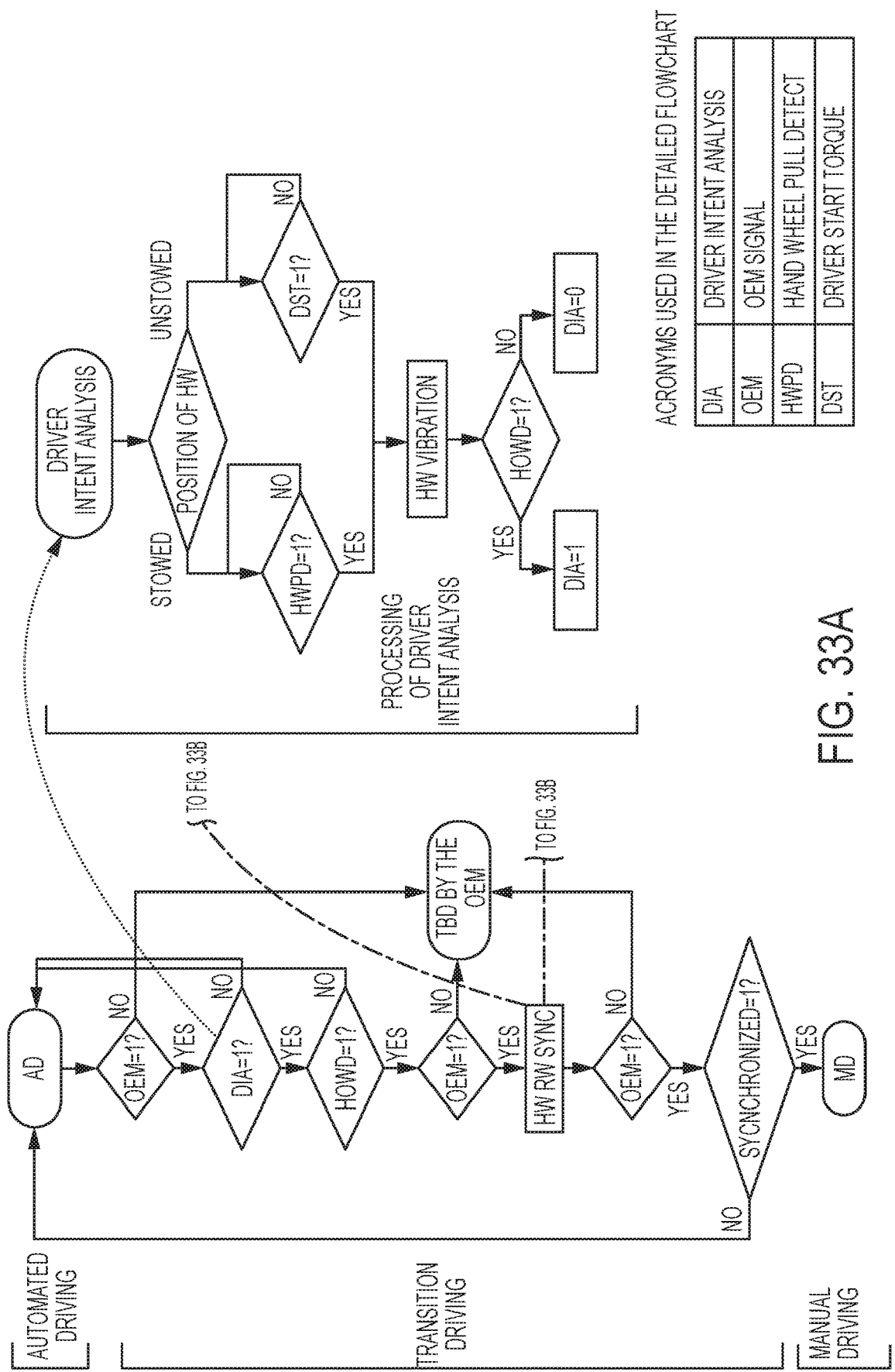
FIG. 33A is an embodiment of a detailed flowchart of the SOD SbW steering system.
Figure 33B:
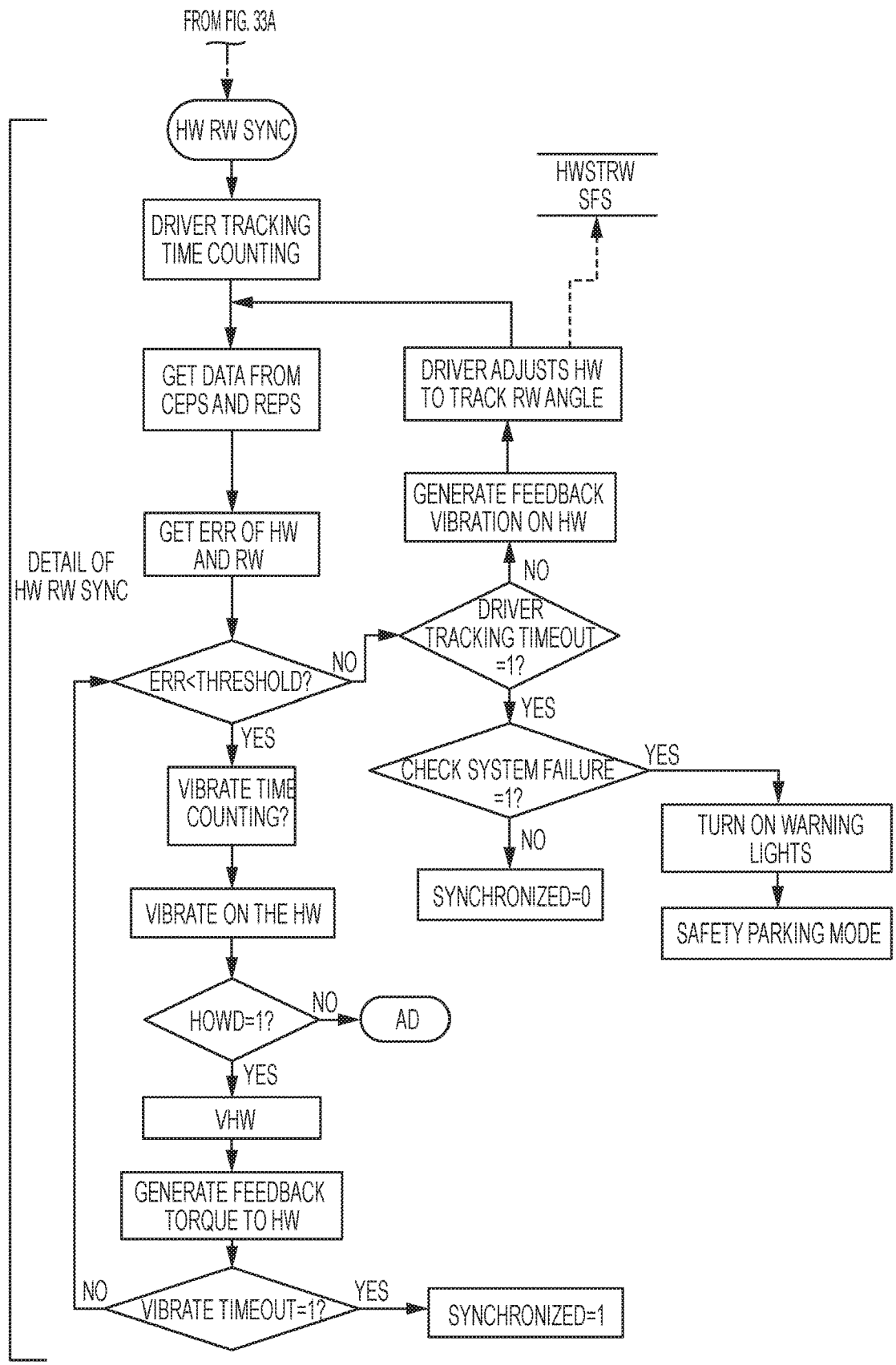
FIG. 33B is a continuation of the detailed flowchart of FIG. 33A.

Referring to FIG. 31, a Steering On Demand—User Experience Sequence of Events describing the transition from AD mode to MD mode is provided as a function of time from $T_0$ to $T_T$ or $T_4$. FIG. 32 provides a state diagram of the system. FIGS. 33A and 33B together provides a detailed flowchart of the SOD SbW steering system 2 described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steer by wire steering system for a vehicle, comprising:
    a steering wheel selectively coupled to a steering shaft, the steering wheel and steering shaft axially movable between a deployed position and a retracted position;
    an advanced driver assist system configured to steer one or more steerable wheels of a vehicle that is in communication with the steering wheel and steering shaft, the advanced driver assist system configured to selectively control the steering of the one or more steerable wheels in an autonomous driving mode that does not require steering input of a vehicle operator and a manual driving mode that does require steering input of a vehicle operator;
    a steering system controller in communication with the advanced driver assist system, the steering system controller programmed to, while the steering wheel is in the retracted position, move the steering wheel to the deployed position in an automatic and motorized manner and operatively couple the steering wheel to the steering shaft, in response to a vehicle operator request to deactivate a portion of the advanced driver assist system and transition from the autonomous driving mode to the manual driving mode; and
    an input device for receiving the operator request, the input device comprising a force sensor in communication with the controller, the operator request comprising application of an axial force to the steering wheel.

2. The steering system of claim 1, further comprising a hand on wheel sensor disposed on the steering wheel that is configured to provide an output signal when at least one hand of an operator engages the steering wheel.

3. The steering system of claim 2, wherein the hand on wheel sensor comprises two switches disposed on generally opposing spokes of the steering wheel.

4. The steering system of claim 2, wherein the hand on wheel sensor comprises an array of sensors disposed about the periphery of a rim of the steering wheel.

5. The steering system of claim 4, wherein the array of sensors comprises capacitive sensors, piezoelectric sensors, or infrared sensors, or a combination thereof.

6. The steering system of claim 2, wherein the controller is further programmed to, in response to the output signal, activate at least one of a visual, a haptic, or an audible indicator of the vehicle.

7. The steering system of claim 2, wherein the output signal comprises the vehicle operator request to deactivate a portion of the advanced driver assist system and transition from the autonomous driving mode to the manual driving mode to affect a transition of the controller.

8. The steering system of claim 2, wherein the output signal further comprises a second vehicle operator request to activate or reactivate a portion of the advanced driver assist system and transition from the manual driving mode to the autonomous driving mode.

9. A selectively autonomously controllable vehicle comprising a steer by wire steering system, comprising:
    a steering shaft axially movable between a deployed position and a retracted position;
    an advanced driver assist system configured to steer one or more steerable wheels of a vehicle that is in communication with the steering shaft, the advanced driver assist system configured to selectively control the steering of the one or more steerable wheels in an autonomous driving mode that does not require steering input of a vehicle operator and a manual driving mode that does require steering input of a vehicle operator;
    a steering system controller in communication with the advanced driver assist system, the steering system controller programmed to, while the steering shaft is in the retracted position, move the steering shaft in an automatic and motorized manner to the deployed position in response to a vehicle operator request to deactivate a portion of the advanced driver assist system and transition from the autonomous driving mode to the manual driving mode; and
    an input device for receiving the operator request, the input device comprising a force sensor coupled to the steering shaft and in communication with the controller.

10. A force sensor for a steering system, comprising:
    an axially extending steering shaft; and
    a force sensor that is operatively coupled to the steering shaft for sensing a generally axial force applied to the steering shaft, the force sensor comprising a displacement/magnetic flux sensor or a load cell.

11. A Steering Wheel Stow Assist System (SWSAS) for a steering system of a vehicle, comprising:
    a steering wheel selectively coupled to a steering shaft, the steering wheel and steering shaft axially movable between a deployed position and a retracted position in an automatic and motorized manner;
    an advanced driver assist system configured to steer one or more steerable wheels of a vehicle that is in communication with the steering wheel and steering shaft, the advanced driver assist system configured to selectively control the steering of the one or more steerable wheels in an autonomous driving mode that does not require steering input of a vehicle operator and a manual driving mode that does require steering input of a vehicle operator;
    an axial force sensor operatively coupled to the steering shaft; and
    a steering system controller in communication with the advanced driver assist system and the axial force sensor, the steering system controller programmed to, while the steering wheel is in the retracted position, move the steering wheel to the deployed position and operatively couple the steering wheel to the steering shaft, in response to a vehicle operator request to deactivate a portion of the advanced driver assist system and transition from the autonomous driving mode to the manual driving mode.

12. The SWSAS of claim 11, further comprising a column position sensor configured to determine an axial position of the steering wheel or a column tilt sensor for measuring the angular position of the steering wheel and column axis with reference to a predetermined reference position.

13. The SWSAS of claim 11, wherein the predetermined reference position comprises a floor of the vehicle or a driver's seat of the vehicle.

* * * * *